(12) United States Patent
Vingiani et al.

(10) Patent No.: US 11,655,019 B2
(45) Date of Patent: *May 23, 2023

(54) METHOD AND SYSTEM FOR COUPLING A VERTICAL STABILIZER TO AN AIRCRAFT FUSELAGE

(71) Applicant: The Boeing Company, Chicago, IL (US)

(72) Inventors: Rosario Vingiani, Seattle, WA (US); Phiyen Thi Pham, Lynnwood, WA (US); Steven Edward Pearson, Lynnwood, WA (US); Peter J. Newnham, Everett, WA (US); Nicholas W. Heintz, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 187 days.

This patent is subject to a terminal disclaimer.

(21) Appl. No.: 17/302,362

(22) Filed: Apr. 30, 2021

(65) Prior Publication Data

US 2022/0017205 A1 Jan. 20, 2022

Related U.S. Application Data

(63) Continuation-in-part of application No. 16/884,911, filed on May 27, 2020, now Pat. No. 11,370,523.

(51) Int. Cl.
*B64F 5/10* (2017.01)
*B64C 1/26* (2006.01)
*B64C 5/06* (2006.01)

(52) U.S. Cl.
CPC ............ *B64C 1/26* (2013.01); *B64C 5/06* (2013.01); *B64F 5/10* (2017.01)

(58) Field of Classification Search
CPC ..... B64C 1/26; B64C 5/06; B64C 3/18; B64C 3/185; B64C 3/187
See application file for complete search history.

(56) References Cited

U.S. PATENT DOCUMENTS 11,511,846 B2 * 11/2022 Campana ............... B64C 7/00
2017/0259902 A1 * 9/2017 Cebolla Garrofe ....... B64C 3/26
(Continued)

FOREIGN PATENT DOCUMENTS

| CN | 109720544 A | 5/2019 |
| EP | 3078586 A1 | 10/2016 |

(Continued)

OTHER PUBLICATIONS

Campana et al., "Aircraft with Multiple Spar Box Connection to Fuselage," U.S. Appl. No. 16/884,911, filed May 27, 2020, 63 pages.

(Continued)

*Primary Examiner* — Timothy D Collins
*Assistant Examiner* — Justin Michael Heston
(74) *Attorney, Agent, or Firm* — Yee & Associates, P.C.

(57) ABSTRACT

A method and system for attaching a vertical stabilizer to an aircraft fuselage using a clevis system is disclosed. A composite skin is installed over the aircraft fuselage. The composite skin has apertures for receiving a plurality of clevises in a clevis system. The plurality of clevises is inserted through the apertures in the composite skin. Each of the plurality of clevises is secured to a frame member in the aircraft fuselage. The vertical stabilizer has a multi-spar box connected with a base rib assembly having a plurality of lugs. The base rib assembly of the vertical stabilizer is engaged with the clevis system. The plurality of lugs in the base rib assembly is secured to the plurality of clevises in the clevis system. Attachment of the vertical stabilizer to the (Continued)

aircraft fuselage, as well as subsequent inspection, may be performed from outside the aircraft.

21 Claims, 30 Drawing Sheets

(56) References Cited

U.S. PATENT DOCUMENTS

2020/0023934 A1\* 1/2020 Martino-Gonzalez .... B64C 5/02
2020/0156758 A1\* 5/2020 Colmenarejo Matellano ..............
                                                    B64C 1/065

FOREIGN PATENT DOCUMENTS

EP         3584152 A1    12/2019
EP         3653490 A1     5/2020

OTHER PUBLICATIONS

Campana et al., "Aircraft with Multiple Spar Box Connection to Fuselage," U.S. Appl. No. 16/885,022, filed May 27, 2020, 66 pages.
European Patent Office Extended Search Report, dated Oct. 14, 2021, regarding EP Application No. 21169331.2, 6 pages.

\* cited by examiner

METHOD AND SYSTEM FOR COUPLING A VERTICAL STABILIZER TO AN AIRCRAFT FUSELAGE

CROSS-REFERENCE TO RELATED APPLICATION

This application is a continuation-in-part of U.S. patent application Ser. No. 16/884,911, filed May 27, 2020, and entitled "Aircraft with Multi Spar Box Connection to Fuselage," which is incorporated herein by reference in its entirety.

BACKGROUND INFORMATION

1. Field

The present disclosure relates generally to aircraft. More specifically, the present disclosure relates to a method and system for coupling a vertical stabilizer to an aircraft fuselage using a lug and clevis system.

2. Background

In aircraft manufacturing and assembly, a vertical stabilizer is connected to the aircraft fuselage using a complex joint system. Multiple configurations of parts may be utilized at the joint. For example, in some configurations, a group of fittings is positioned between the vertical stabilizer and the fuselage. A first group of fasteners is used to attach the vertical stabilizer to the fittings and a second group of fasteners is used to attach the fuselage to the fittings. This type of configuration, however, poses difficulties for human operators because installation requires them to work in confined spaces. The confined spaces, coupled with this configuration of the vertical stabilizer-to-fuselage joint, also makes in-service inspection difficult.

In other configurations, lugs and standard dual wall clevises are used between the vertical stabilizer and the fuselage. These lugs and dual wall clevises are oriented in a longitudinal direction and additional lugs and standard dual wall clevises are oriented in a lateral direction and positioned between each of the longitudinal lugs and clevises. But, this type of configuration is also difficult to install due to the required attachment of the lateral lugs between mid-spars.

Therefore, it would be desirable to have a method and an apparatus that take into account at least some of the issues discussed above, as well as other possible issues.

SUMMARY

An illustrative embodiment of the present disclosure provides a method for attaching a vertical stabilizer to an aircraft fuselage using a clevis system. A composite skin is installed over the aircraft fuselage. The composite skin has apertures for receiving a plurality of clevises in a clevis system. The plurality of clevises is inserted through the apertures in the composite skin. Each of the plurality of clevises is secured to a frame member in the aircraft fuselage. A base rib assembly of the vertical stabilizer is engaged with the clevis system. A plurality of lugs in the base rib assembly is secured to the plurality of clevises in the clevis system. Such processes, as well as subsequent inspection, may be performed from outside the aircraft.

Another illustrative embodiment of the present disclosure provides a method for attaching a vertical stabilizer having a multi-spar box to an aircraft fuselage with a composite skin. The composite skin is positioned over the aircraft fuselage. The composite skin has apertures for receiving a plurality of clevises in a clevis system. The composite skin is then joined to a plurality of frame members in the aircraft fuselage. Each of the plurality of clevises is inserted through the apertures in the composite skin and secured to a frame member in the aircraft fuselage. An intercostal is installed between two frame members in the plurality of frame members. More than one intercostal may be installed. A base rib assembly of the vertical stabilizer is engaged with the clevis system. A plurality of lugs in the base rib assembly is secured to the plurality of clevises in the clevis system by inserting retaining members through mounting holes in each corresponding lug and clevis. Such processes, as well as subsequent inspection, may be performed from outside the aircraft.

A further illustrative embodiment of the present disclosure provides an aircraft comprising a fuselage, a vertical stabilizer, a base rib assembly, a clevis system, and retaining members. The aircraft fuselage has a plurality of frame members and a composite skin. The vertical stabilizer has a multi-spar box comprising a front spar, a rear spar, at least one mid spar positioned between the front spar and rear spar, a first side skin, and a second side skin. The base rib assembly is secured to the multi-spar box and has a plurality of lugs. The clevis system is inserted through apertures in the composite skin and attached to the plurality of frame members. The clevis system is configured to receive the plurality of lugs. The retaining members are inserted through corresponding mounting holes in the plurality of lugs and plurality of clevises to attach the vertical stabilizer to the aircraft fuselage.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that attachment of a vertical stabilizer to an aircraft fuselage may be more difficult, complex, and time-consuming than desired. Each stabilizer-to-fuselage joint has a multitude of fasteners and pieces that must be secured to one another to create an attachment that is both functional and airworthy. Making the situation more complex are the ergonomic concerns. In this section of the aircraft fuselage, access is limited from inside the fuselage assembly. Human operators have an exceedingly difficult time maneuvering these confined spaces. Post-installation and in-service inspection prove difficult as well.

The illustrative embodiments further recognize and take into account that attachment of the vertical stabilizer to the aircraft fuselage is particularly difficult when composite materials are used. Stress and strain concerns arise during installation. Currently used installation techniques require shimming, which increases production time.

The illustrative embodiments also recognize and take into account that currently used joint systems may make rework of the vertical stabilizer, its joint, the corresponding fuselage frame or composite skin in that area more difficult and costly than desired. Since inspection from the outside of the aircraft fuselage is unable to reveal the full picture of possible damage, the joint may have to be completely detached to fully inspect its parts, or the use of an access hatch may be warranted. Detachment requires human operators to operate in that same confined space, leading to similar ergonomic concerns and increased possibility for additional damage to the composite parts during detachment or disassembly.

Thus, the disclosed embodiments relate to a versatile, cost-saving and timesaving method for attaching a vertical stabilizer to an aircraft fuselage having a composite skin. The composite skin is positioned over the aircraft fuselage. The composite skin has apertures for receiving a plurality of clevises in a clevis system. The composite skin is then joined to a plurality of frame members in the aircraft fuselage. Each of the plurality of clevises is inserted through the apertures in the composite skin and secured to a frame member. An intercostal is installed between two frame members in the plurality of frame members. More than one intercostal may be installed. The vertical stabilizer has a multi-spar box attached to a base rib assembly. The base rib assembly is engaged with the clevis system. A plurality of lugs in the base rib assembly is secured to the plurality of clevises in the clevis system by inserting retaining members through mounting holes in each corresponding lug and clevis. Such installation processes, as well as subsequent inspection, are performed from outside the aircraft, thus leading to ergonomic advantages.

Figure 1:
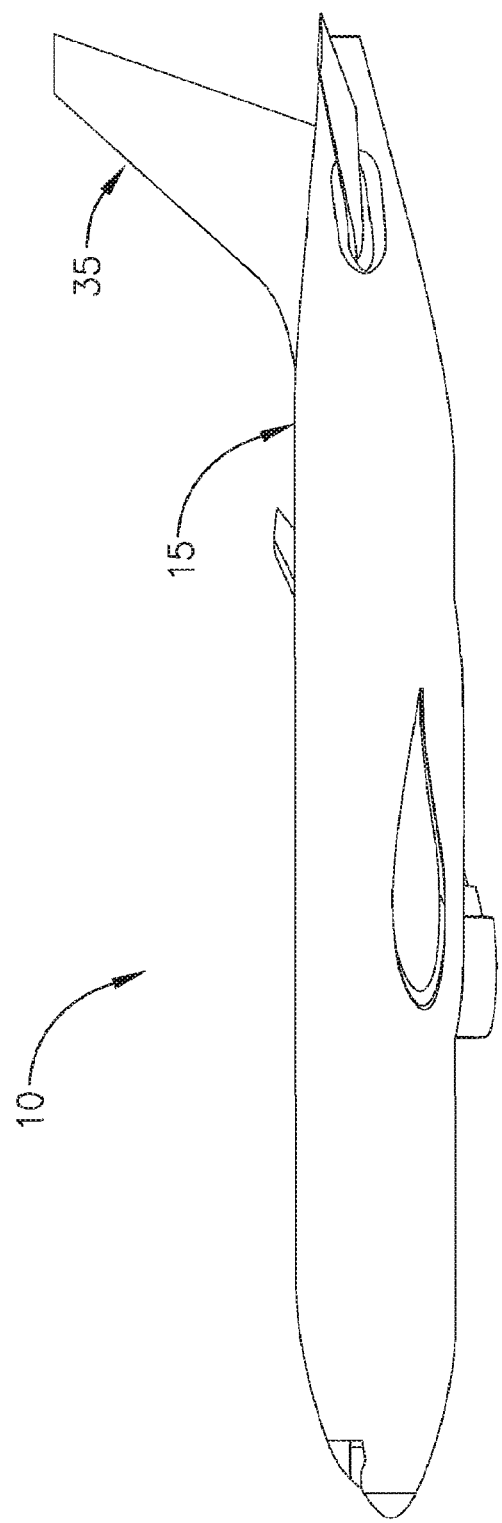
FIG. 1 is an illustration of a side view of an aircraft in accordance with an illustrative embodiment.
Figure 2:
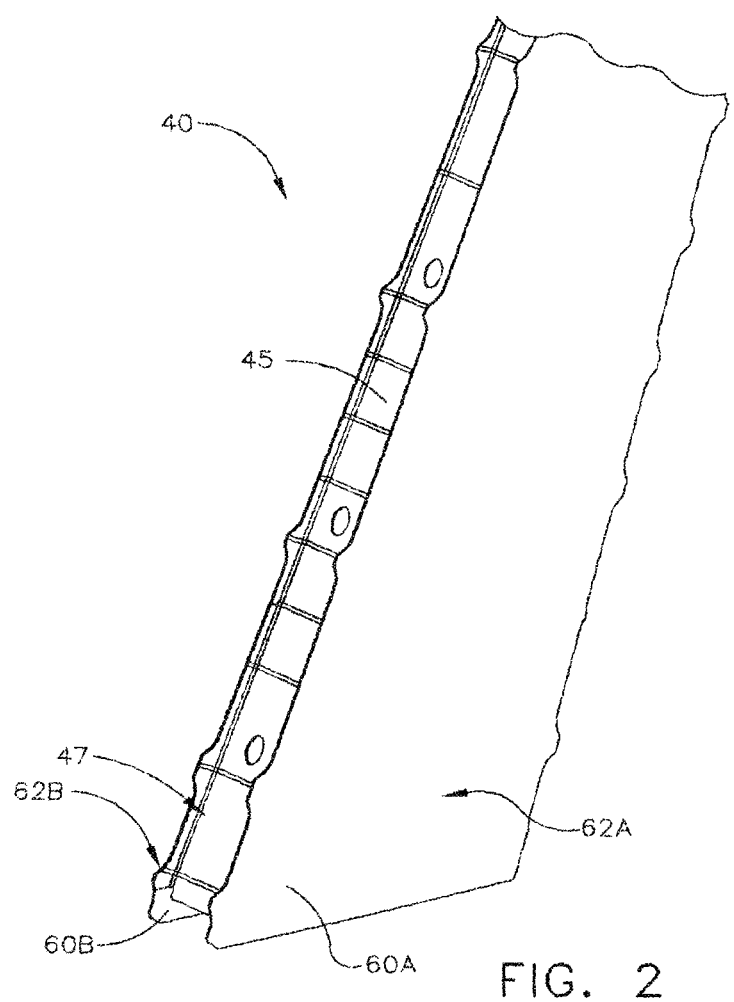
FIG. 2 is an illustration of a partial perspective view of a multi-spar box of the vertical stabilizer of an aircraft in accordance with an illustrative embodiment.
Figure 3:
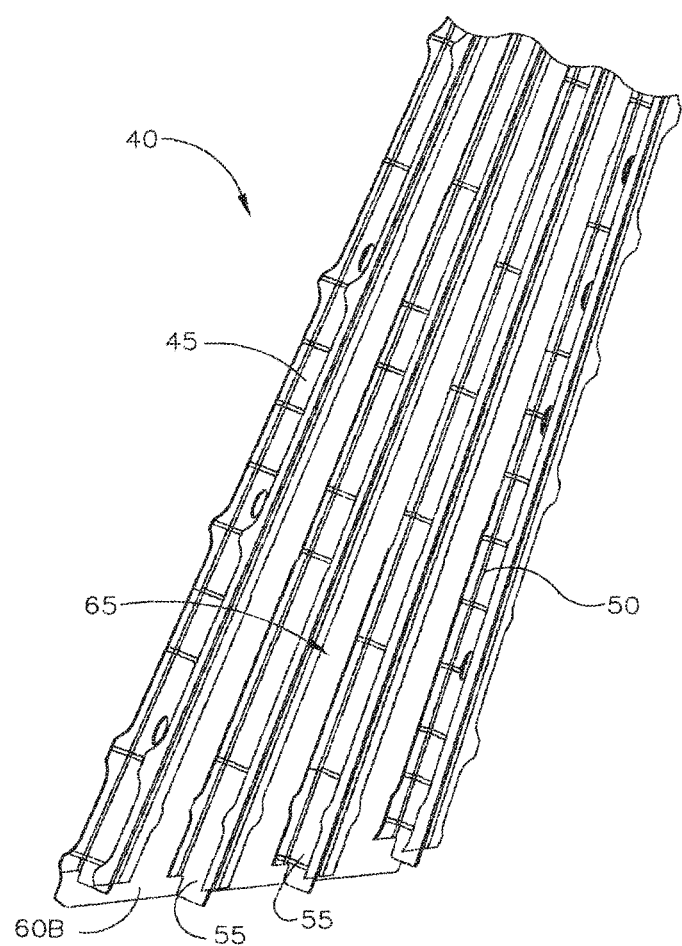
FIG. 3 is an illustration of a partial perspective view of a multi-spar box with a side skin removed.

Referring to FIGS. 1-3, an example aircraft 10 is illustrated having an aircraft fuselage 15 with a plurality of frame members 20 and an outer skin 25 (see FIGS. 8-10, 15-17, and 22-24) and vertical stabilizer 35 with a multi-spar box 40 connected to aircraft fuselage 15. As can be seen in FIGS. 2-3, multi-spar box 40 of vertical stabilizer 35 has a front spar 45, a rear spar 50, and at least one of mid spars 55 positioned between and spaced apart from front spar 45 and rear spar 50. In the example shown, multi-spar box 40 has two mid spars 55, but can have any number of mid spars 55 appropriate for a given application. A first side skin 60A and a second side skin 60B, opposite first side skin 60A, extend between front spar 45 and rear spar 50. Front spar 45, rear spar 50, first side skin 60A, and second side skin 60B together define an interior 65 of multi-spar box 40.

Figure 4:
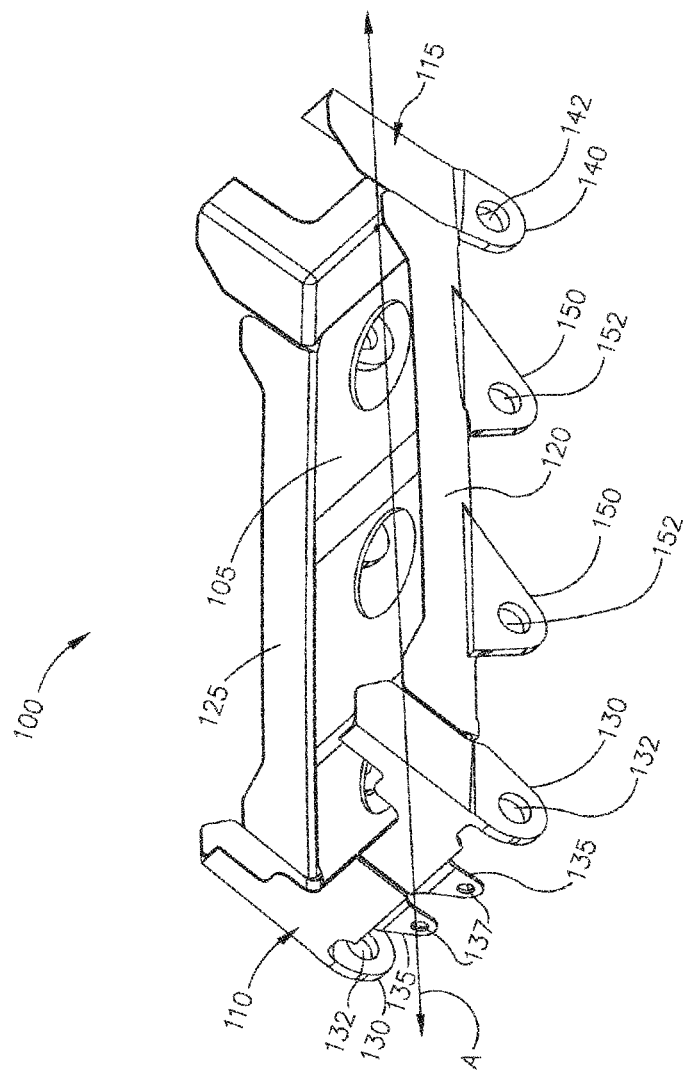
FIG. 4 is an illustration of a front perspective view of a first example base rib assembly in accordance with an illustrative embodiment.
Figure 5:
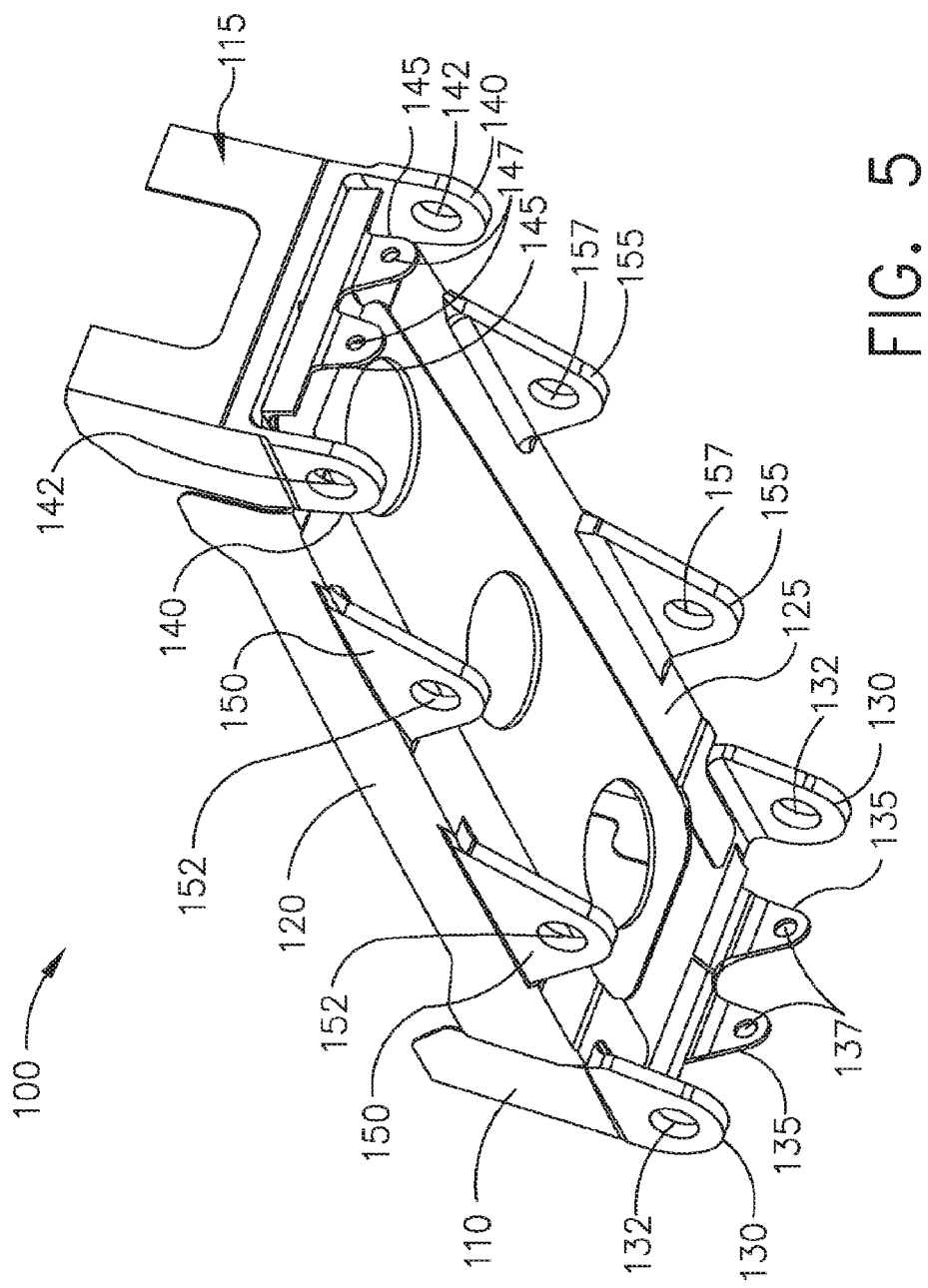
FIG. 5 is an illustration of a rear perspective view of a first example base rib assembly in accordance with an illustrative embodiment.
Figure 11:
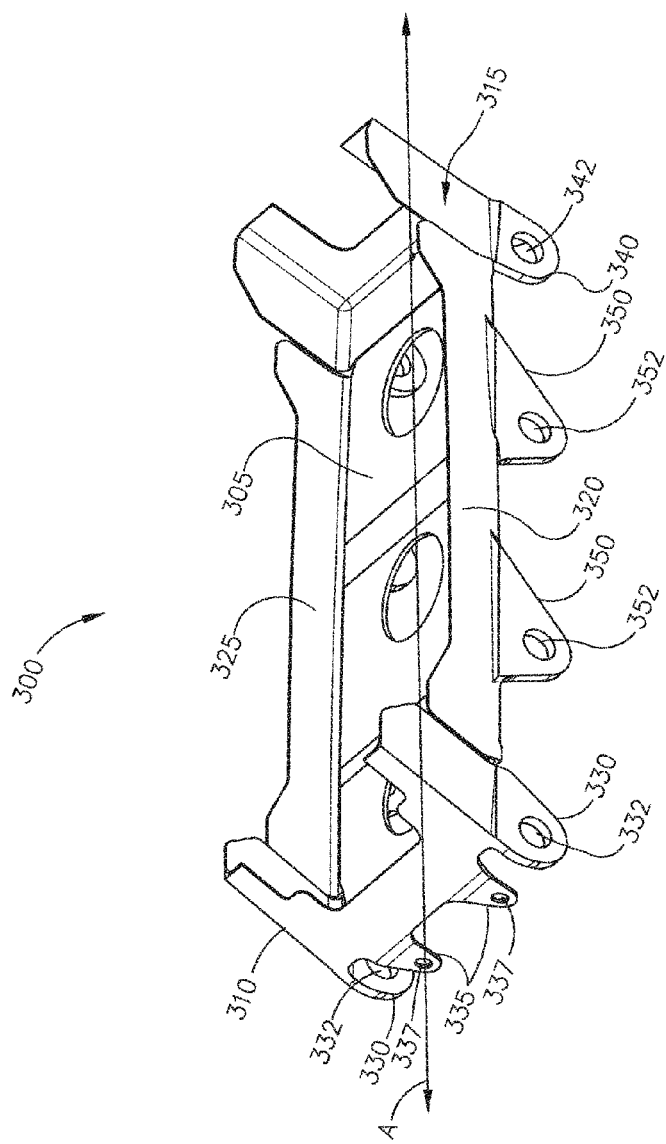
FIG. 11 is an illustration of a front perspective view of a second example base rib assembly in accordance with an illustrative embodiment.
Figure 12:
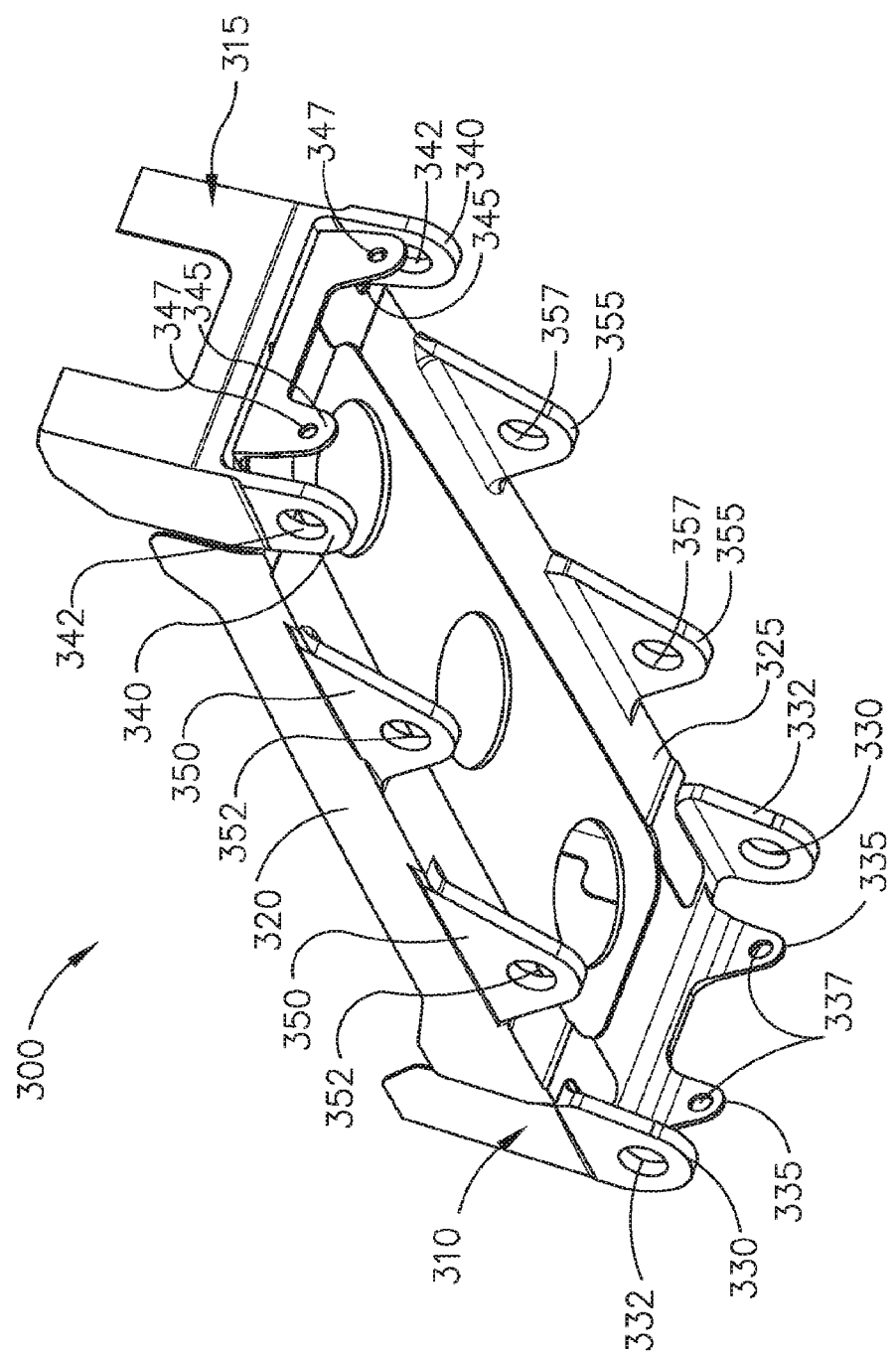
FIG. 12 is an illustration of a rear perspective view of a base rib assembly in accordance with an illustrative embodiment.

Referring to FIGS. 4-10, a first example connection between aircraft fuselage 15 and multi-spar box 40 of vertical stabilizer 35 is shown. As best seen in FIGS. 4-5, a base rib assembly 100 has a base rib 105 and a front terminal fitting 110, rear terminal fitting 115 opposite front terminal fitting 110, first side chord 120, and second side chord 125 opposite first side chord 120, attached to base rib 105. Front terminal fitting 110 includes a pair of opposing front longitudinal lugs 130 extending parallel to a longitudinal axis A of base rib assembly 100 and a pair of front lateral lugs 135 extending perpendicular to longitudinal axis A and positioned between the pair of front longitudinal lugs 130. As shown, front terminal fitting 110 includes two pieces, each having one front longitudinal lug 130 and one front lateral lug 135, but could also be one single, unitary piece having both front longitudinal lugs 130 and front lateral lugs 135, as shown in FIGS. 11-12. Rear terminal fitting 115 includes a pair of opposing rear longitudinal lugs 140 extending parallel to longitudinal axis A and a pair of rear lateral lugs 145 extending perpendicular to longitudinal axis A and positioned between the pair of rear longitudinal lugs 140. As shown, rear terminal fitting 115 is a single unitary piece having both rear longitudinal lugs 140 and both rear lateral lugs 145, but could also be two pieces, each having one rear longitudinal lug 140 and one rear lateral lug 145. First side chord 120 has at least one first middle longitudinal lug 150 extending parallel to longitudinal axis A and second side chord 125 has at least one second middle longitudinal lug 155, opposite first longitudinal lug 150. As shown, first side chord 120 has two first middle longitudinal lugs 150 and second side chord 125 has two second longitudinal lugs 155, however, first and second side chords 120, 125 can have any number of longitudinal lugs desired for a particular application. In addition, in the particular example shown, there are no lateral lugs positioned between first middle longitudinal lugs 150 and second longitudinal lugs 155. Therefore, in the example shown in FIGS. 4-10, base rib assembly 100 has a pair of opposing front longitudinal lugs 130, a pair of opposing rear longitudinal lugs 140, at least one pair of opposing middle longitudinal lugs 150, 155 disposed between front longitudinal lugs 130 and rear longitudinal lugs 140, a pair of front lateral lugs 135 disposed between front longitudinal lugs 130, and a pair of rear lateral lugs 145 disposed between rear longitudinal lugs 140.

Figure 6:
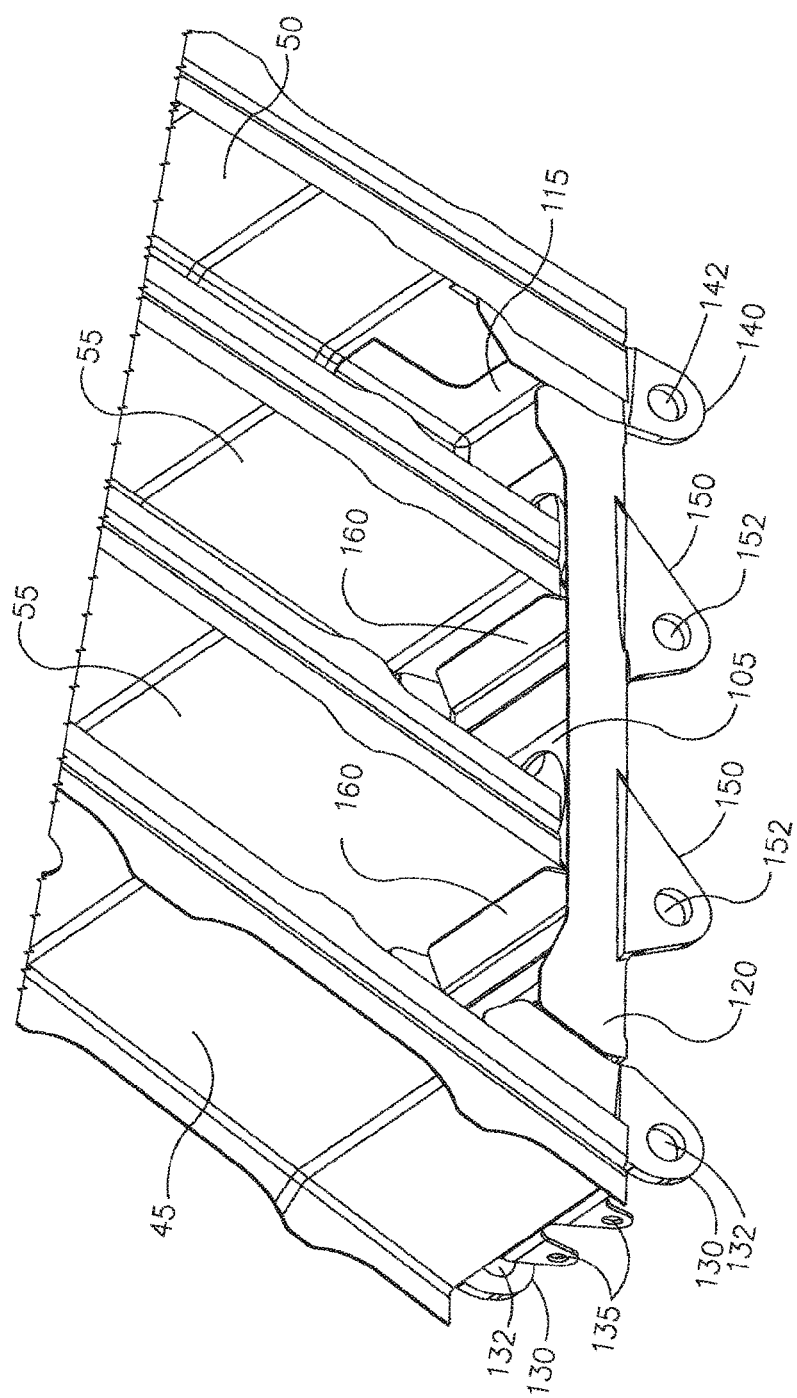
FIG. 6 is an illustration of a front perspective view of a base rib assembly positioned within a multi-spar box with a side skin removed in accordance with an illustrative embodiment.
Figure 7:
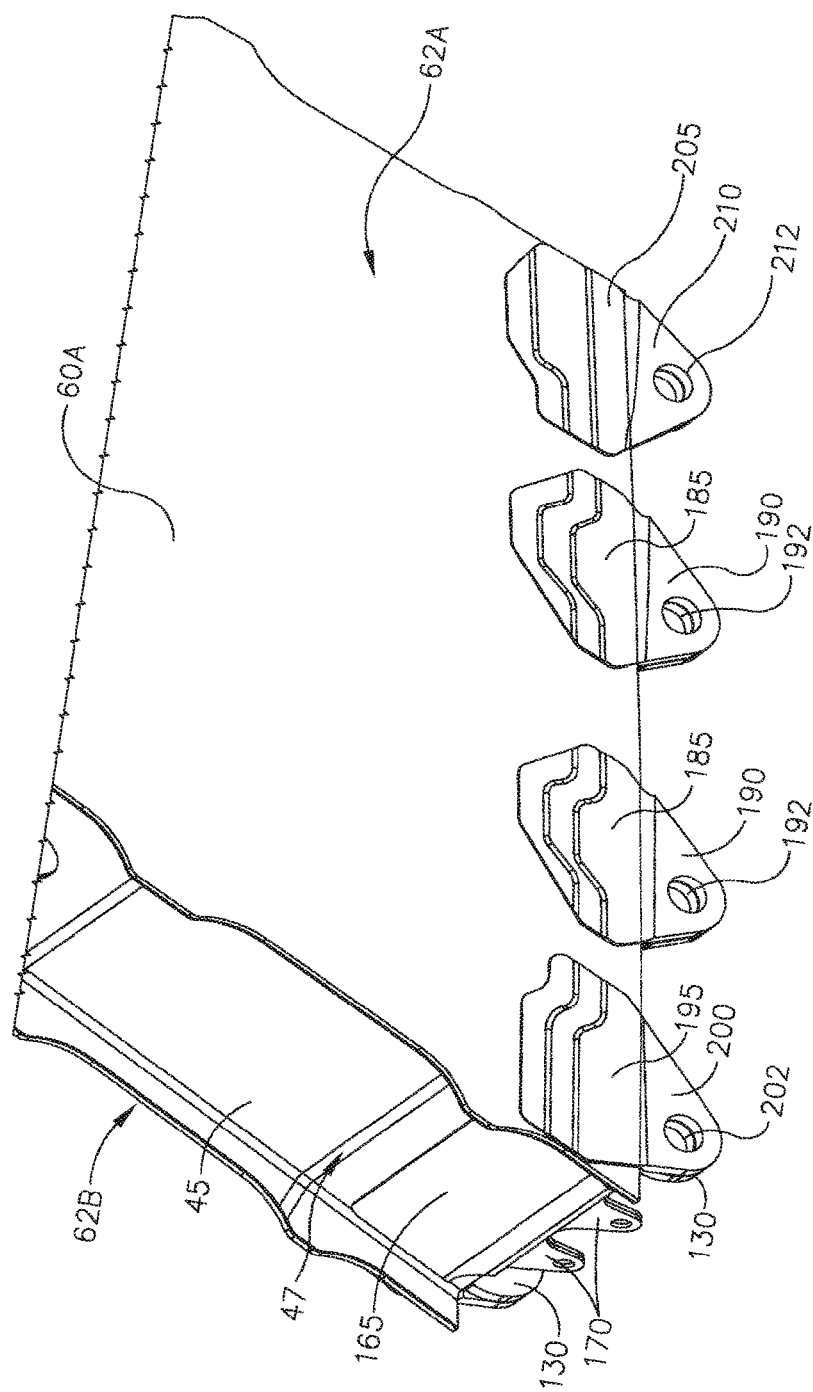
FIG. 7 is an illustration of a front perspective view of a base rib assembly fully assembled with the multi-spar box in accordance with an illustrative embodiment.

As seen in FIGS. 6-7, base rib assembly 100 is positioned in interior 65 of multi-spar box 40 and secured to multi-spar box 40. For example, front terminal fitting 110 of base rib assembly 100 can be secured to front spar 45 of multi-spar box 40 with screws, bolts, welding, or any other well-known securement method. Similarly, rear terminal fitting 115 can be secured to rear spar 50 with screws, bolts, welding, or any other well-known securement method. In addition, mid spars 55 can be secured to base rib assembly 100 by attaching L-shaped shear clips 160 between base rib 105 and/or first and second side chords 120, 125 of base rib assembly 100 and mid spars 55 with screws, bolts, welding, or any other well-known securement method.

Referring to FIG. 7, with base rib assembly 100 positioned in multi-spar box 40, a front plate 165 is positioned adjacent exterior surface 47, or adjacent an interior surface, of front spar 45 and is secured to front spar 45 and base rib assembly 100, for example, by screws that are threaded through front plate 165, front spar 45, and front terminal fitting 110 of base rib assembly 100. Alternatively, front plate 165 can be secured to front spar 45 and base rib assembly 100 by bolts, welding, or any other well-known securement method. Front plate 165 includes lateral lugs 170 that correspond to each of the front lateral lugs 135 of front terminal fitting 110 and that are adjacent to and aligned with corresponding front lateral lugs 135. As shown, front plate 165 is a single, unitary piece including both lateral lugs 170, but could also be two or more pieces, each having a single lateral lug 170 that corresponds to a front lateral lug 135. Similarly, a rear plate 175 is positioned adjacent exterior surface 52, or adjacent an interior surface, of rear spar 50, opposite front plate 165, and is secured to rear spar 50 and base rib assembly 100, for example, by screws that are threaded through rear plate 175, rear spar 50, and rear terminal fitting 115 of base rib assembly 100. Alternatively, rear plate 175 can be secured to rear spar 50 and base rib assembly 100 by bolts, welding, or any other well-known securement method. Rear plate 175 includes lateral lugs 180 that correspond to each of the rear lateral lugs 145 of rear terminal fitting 115 and that are adjacent to and aligned with corresponding rear lateral lugs 145. As shown, rear plate 175 is a single, unitary piece including both lateral lugs 180, but could also be two or more pieces, each having a single lateral lug 180 that corresponds to a rear lateral lug 145.

First side plates 185 are positioned adjacent exterior surface 62A of first side skin 60A and are secured to first side skin 60A and base rib assembly 100, for example, by screws that are threaded through first side plates 185, first side skin 60A, and first side chord 120. Alternatively, first side plates 185 could be secured to first side skin 60A and base rib assembly 100 by bolts, welding, or any other well-known securement method. Each first side plate 185 includes a longitudinal lug 190 that is adjacent to and aligned with a corresponding first middle longitudinal lug 150. In the example shown, there are two first side plates 185 since there are two first middle longitudinal lugs 150. However, there could be any number of first side plates 185 as required for the number of first middle longitudinal lugs 150. In addition, rather than individual first side plates 185, a single, unitary piece first side plate could be used that has multiple longitudinal lugs that each correspond to a first middle longitudinal lug. Corresponding second side plates (not shown) are also positioned adjacent exterior surface 62B of second side skin 60B, opposite corresponding first side plates 185, and are secured to second side skin 60B and base rib assembly 100, for example, by screws that are threaded through the second side plates, second side skin 60B, and second side chord 125. Alternatively, second side plates can be secured to second side skin 60B and base rib assembly 100 by bolts, welding, or any other well-known securement method. Each second side plate includes a longitudinal lug that is adjacent to and aligned with a corresponding second middle longitudinal lug 155. As with first side plates 185, there could be any number of second side plates as required for the number of second middle longitudinal lugs 155 or, rather than individual second side plates, a single, unitary piece second side plate could be used that has multiple longitudinal lugs that each correspond to a second middle longitudinal lug 155.

Third side plate 195 is positioned adjacent exterior surface 62A of first side skin 60A and is secured to first side skin 60A and base rib assembly 100, for example, by screws that are threaded through third side plate 195, first side skin 60A, and front terminal fitting 110. Alternatively, third side plates 195 can be secured to first side skin 60A and base rib assembly 100 by bolts, welding, or any other well-known securement method. Third side plate 195 includes a longitudinal lug 200 that is adjacent to and aligned with a corresponding front longitudinal lug 130. Corresponding fourth side plate (not shown) is also positioned adjacent exterior surface 62B of second side skin 60B, opposite corresponding third side plate 195, and is secured to second side skin 60B and base rib assembly 100, for example, by screws that are threaded through the fourth side plate, second side skin 60B, and front terminal fitting 110. Alternatively, fourth side plates can be secured to second side skin 60B and base rib assembly 100 by bolts, welding, or any other well-known securement method. Fourth side plate includes a longitudinal lug that is adjacent to and aligned with a corresponding front longitudinal lug 130.

Fifth side plate 205 is positioned adjacent exterior surface 62A of first side skin 60A and is secured to first side skin 60A and base rib assembly 100, for example, by screws that are threaded through fifth side plate 205, first side skin 60A, and rear terminal fitting 115. Alternatively, fifth side plates 205 can be secured to first side skin 60A and base rib assembly 100 by bolts, welding, or any other well-known securement method. Fifth side plate 205 includes a longitudinal lug 210 that is adjacent to and aligned with a corresponding rear longitudinal lug 140. Corresponding sixth side plate (not shown) is also positioned adjacent exterior surface 62B of second side skin 60B, opposite corresponding fifth side plates 205, and is secured to second side skin 60B and base rib assembly 100, for example, by screws that are threaded through the sixth side plate, second side skin 60B, and rear terminal fitting 115. Alternatively, sixth side plates can be secured to second side skin 60B and base rib assembly 100 by bolts, welding, or any other well-known securement method. Sixth side plate includes a longitudinal lug that is adjacent to and aligned with a corresponding rear longitudinal lug 140.

Figure 8:
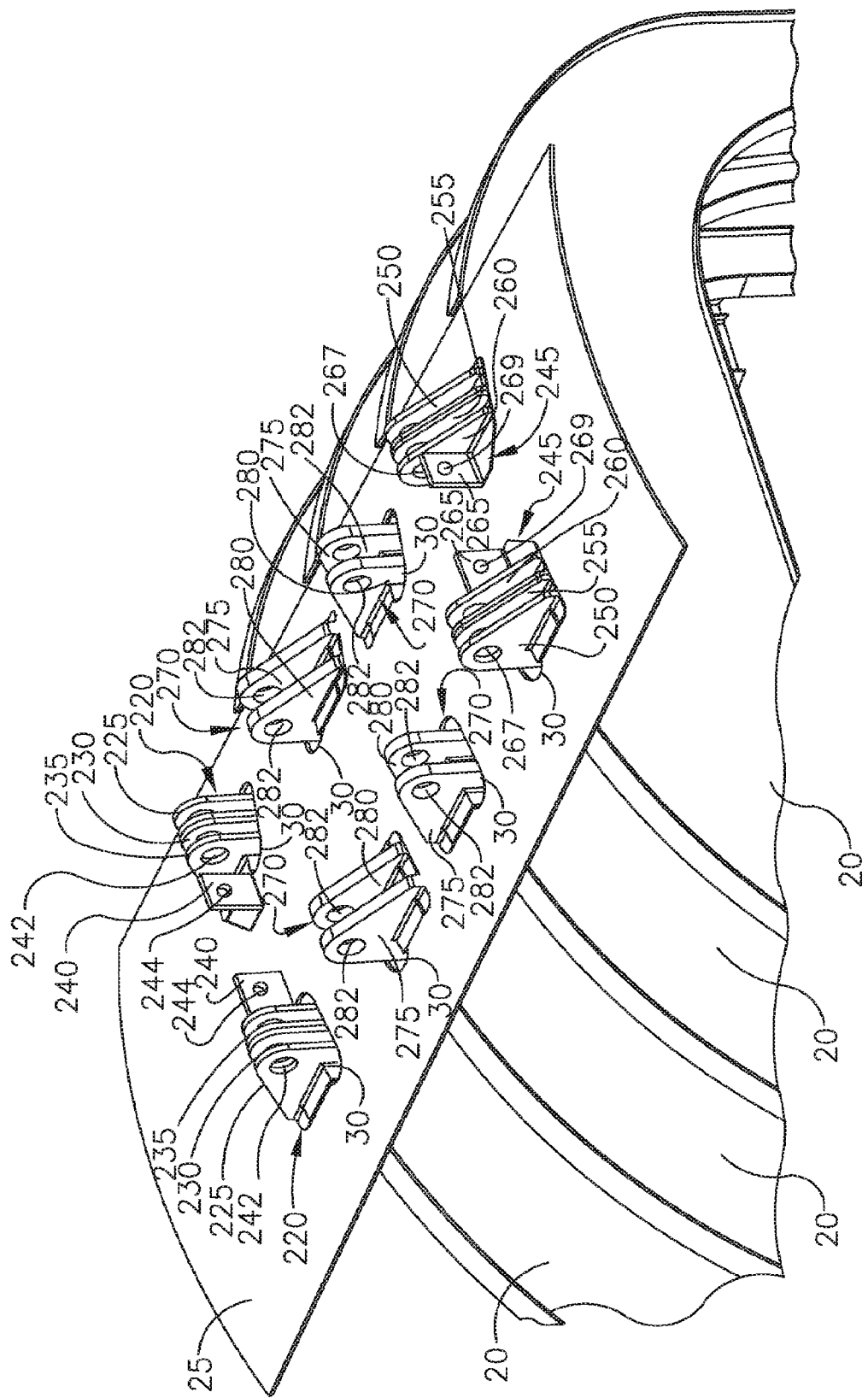
FIG. 8 is an illustration of a portion of the fuselage of an aircraft with a first set of clevises in accordance with an illustrative embodiment.

Referring to FIG. 8, a pair of front clevises 220 correspond to the pair of front longitudinal lugs 130 and each of front clevises 220 extends through a corresponding aperture 30 in outer skin 25 and is secured to a frame member 20 of aircraft fuselage 15. In the example shown, front clevises 220 each have first, second, and third mounting arms 225, 230, 235 and a lateral wall 240 that extends inward, generally perpendicular to third mounting arm 235. Similarly, a pair of rear clevises 245 correspond to the pair of rear longitudinal lugs 140 and each rear clevis 245 extends through a corresponding aperture 30 in outer skin 25 and is secured to a frame member 20 of aircraft fuselage. In the example shown, rear clevises 245 each have first, second, and third mounting arms 250, 255, 260 and a lateral wall 240 that extends inward, generally perpendicular to third mounting arm 260. Pairs of middle clevises 270 correspond to the pairs of middle longitudinal lugs 150, 155 and each middle clevis 270 extends through a corresponding aperture 30 in outer skin 25 and is secured to a frame member 20 of aircraft fuselage 15. Middle clevises 270 each have only first and second mounting arms 275, 280.

Figure 9:
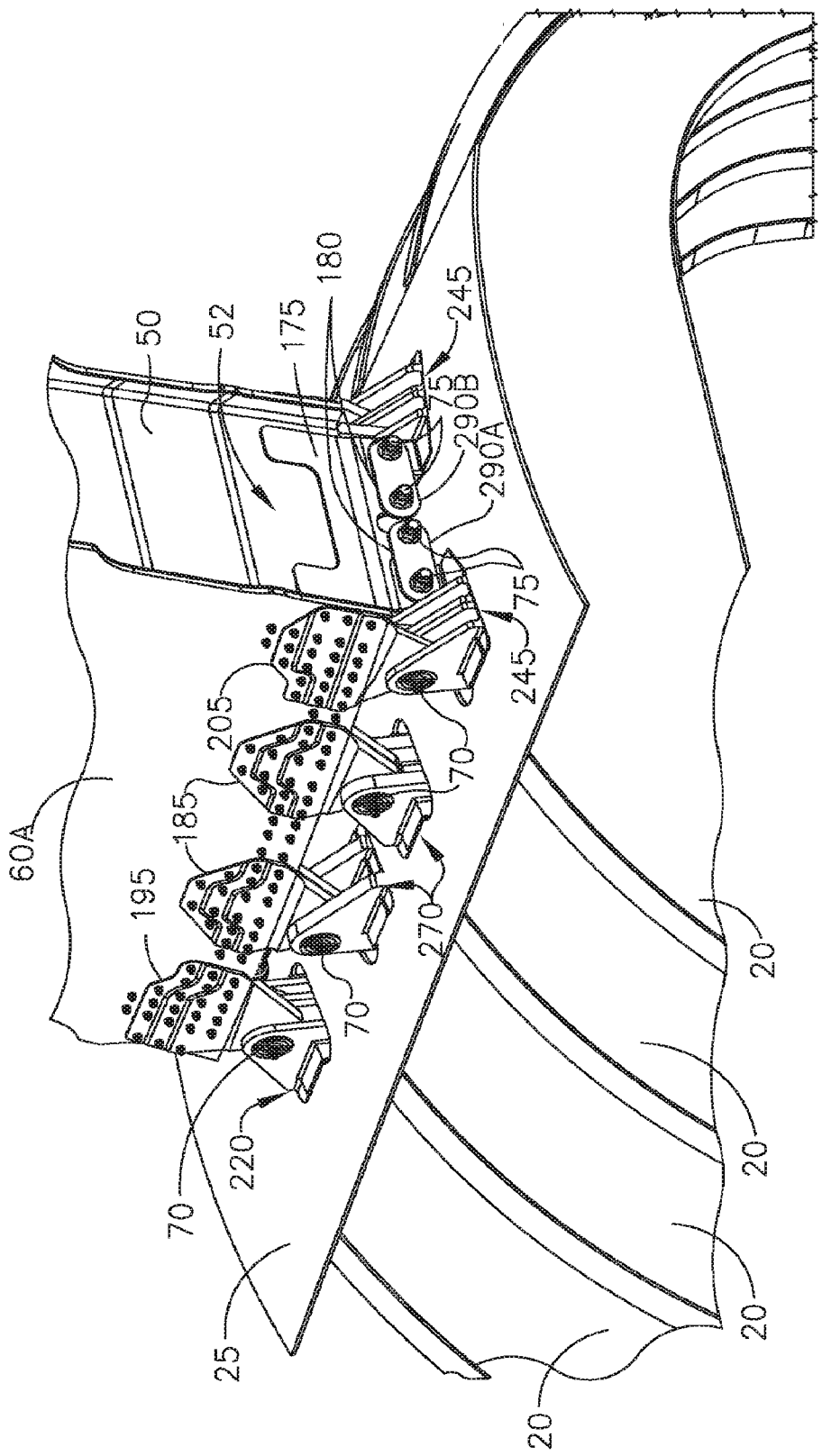
FIG. 9 is an illustration of a rear perspective view of a multi-spar box and base rib assembly connected to the fuselage in accordance with an illustrative embodiment.
Figure 10:
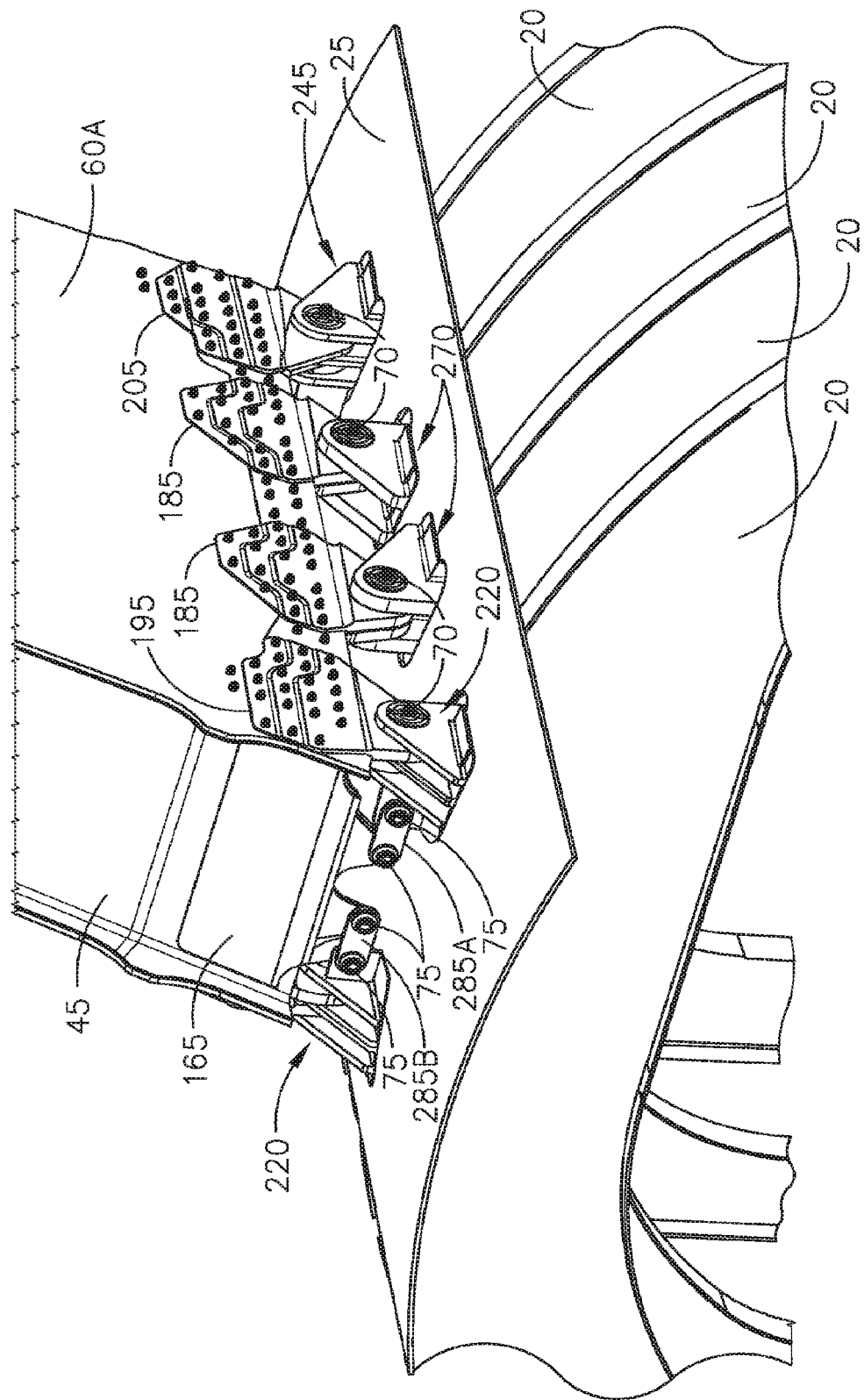
FIG. 10 is an illustration of a front perspective view of a multi-spar box, a base rib assembly, and a fuselage in accordance with an illustrative embodiment.

Referring to FIGS. 9-10, longitudinal lugs 190 of first side plates 185 and corresponding first middle longitudinal lugs 150 of base rib assembly 100 are positioned between first mounting arm 275 and second mounting arm 280 of the corresponding middle clevis 270 and longitudinal lugs of second side plates (now shown) and corresponding second middle longitudinal lugs 155 of base rib assembly 100 are positioned between first mounting arm 275 and second mounting arm 280 of the corresponding middle clevis 270. Retaining members 70, such as bolts, pins, etc., are inserted through mounting holes 152, 157 in each middle longitudinal lug 150, 155, mounting holes 192 in first side plate 185 and second side plate, and mounting holes 282 in each mounting arm 275, 280 of each corresponding middle clevis 270 to secure vertical stabilizer 35 to aircraft fuselage 15.

In addition, longitudinal lug 200 of third side plate 195 is positioned between first mounting arm 225 and second mounting arm 230 of the corresponding front clevis 220 and the corresponding front longitudinal lug 130 of base rib assembly 100 is positioned between second mounting arm 230 and third mounting arm 235 of the corresponding front clevis 220. The longitudinal lug of the fourth side plate is similarly positioned between first mounting arm 225 and second mounting arm 230 of the corresponding front clevis 220 on the opposite side and the corresponding front longitudinal lug 130 of base rib assembly 100 is positioned between second mounting arm 230 and third mounting arm 235 of the corresponding front clevis 220. Retaining members 70, such as bolts, pins, etc., are inserted through mounting holes 132 in each front longitudinal lug 130, mounting holes 202 in third side plate 195 and fourth side plate, and mounting holes 242 in each mounting arm 225, 230, 235 of each corresponding front clevis 220 to secure vertical stabilizer 35 to aircraft fuselage 15.

Similarly, longitudinal lug 210 of fifth side plate 205 is positioned between first mounting arm 250 and second mounting arm 255 of the corresponding rear clevis 245 and the corresponding rear longitudinal lug 140 of base rib assembly 100 is positioned between second mounting arm 255 and third mounting arm 260 of the corresponding rear clevis 245. The longitudinal lug of the sixth side plate is similarly positioned between first mounting arm 250 and second mounting arm 255 of the corresponding rear clevis 245 on the opposite side and the corresponding rear longitudinal lug 140 of base rib assembly 100 is positioned between second mounting arm 255 and third mounting arm 260 of the corresponding rear clevis 245. Retaining members 70 such as bolts, pins, etc., are inserted through mounting holes 142 in each rear longitudinal lug 140, mounting holes 212 in fifth side plate 205 and sixth side plate, and mounting holes 267 in each mounting arm 250, 255, 260 of each corresponding rear clevis 245 to secure vertical stabilizer 35 to aircraft fuselage 15.

To provide lateral support for vertical stabilizer 35, first and second front links 285A, B interconnect each of the pair of front lateral lugs 135 of front terminal fitting 110 and a corresponding lateral wall 240 of one of the pair of front clevises 220 via retaining members 75, such as bolts, pins, etc., that extend through mounting holes 137 in front lateral lugs 135 and mounting holes 244 in lateral walls 240 of front clevises 220. Similarly, first and second rear links 290A, B interconnect each of the pair of rear lateral lugs 145 of rear terminal fitting 115 and a corresponding lateral wall 265 of one of the pair of rear clevises 245 via retaining members 75, such as bolts, pins, etc., that extend through mounting holes 147 in rear lateral lugs 145 and mounting holes 269 in lateral walls 265 of rear clevises 245.

To attach vertical stabilizer 35 to aircraft fuselage 15 as discussed above, base rib assembly 100 is first assembled, which, as discussed above, has a pair of opposing front longitudinal lugs 130, a pair of opposing rear longitudinal lugs 140, at least one pair of opposing middle longitudinal lugs 150, 155 between front longitudinal lugs 130 and rear longitudinal lugs 140, and pairs of front and rear lateral lugs 135, 145, each of which have a corresponding mounting hole 132, 142, 152, 157, 137, 147. To assemble base rib assembly 100, first side chord 120 is attached to base rib 105, second side chord 125 is attached to base rib 105, opposite first side chord 120, front terminal fitting 110 is attached to base rib 105, and rear terminal fitting 115 is attached to base rib 105, opposite front terminal fitting 110. Base rib assembly 100 is then inserted into interior 65 of multi-spar box 40 of vertical stabilizer 35 and L-shaped shear clips 160 are attached between mid spars 55 and base rib assembly 100.

Front plate 165 is then positioned adjacent exterior surface 47, or adjacent an interior surface, of front spar 45 and is secured to front spar 45 and base rib assembly 100, rear plate 175 is positioned adjacent exterior surface 52, or adjacent an interior surface, of rear spar 50, opposite front plate 165, and is secured to rear spar 50 and base rib assembly 100, first side plate 185 is positioned adjacent exterior surface 62A of first side skin 60A of multi-spar box 40 and is secured to first side skin 60A and base rib assembly 100, and the second side plate 187 is positioned adjacent exterior surface 62B of second side skin 60B of multi-spar box 40 and is secured to second side skin 60B and base rib assembly 100.

Front clevises 220, rear clevises 245, and middle clevises 270 are inserted through corresponding apertures 30 in outer skin 25 of aircraft fuselage 15 and are secured to corresponding frame member 20 of aircraft fuselage, for example, with bolts, screws, rivets, welding, etc. Front clevises 220 correspond to front longitudinal lugs 130 and each have first, second, and third mounting arms 225, 230, 235 with mounting holes 242 and rear clevises 245 correspond to rear longitudinal lugs 140 and each have first, second, and third mounting arms 250, 255, 260 with mounting holes 267. Middle clevises 270 correspond to middle longitudinal lugs 150, 155 and each have only first and second mounting arms 275, 280 with mounting holes 282.

Vertical stabilizer 35 is then positioned adjacent aircraft fuselage 15 such that each front, rear, and middle longitudinal lug 130, 140, 150, 155 is aligned with a corresponding front, rear, or middle clevises 220, 245, 270 and retaining members 70 are inserted through mounting holes 132, 142, 152, 157 of each longitudinal lug 130, 140, 150, 155 and mounting holes 242, 267, 282 of each corresponding clevises 220, 245, 270 to secure vertical stabilizer 35 to aircraft fuselage 15. Each front lateral lug 135 is attached to a first end of a corresponding front link 285A, 285B with retaining members 75 and a second end of front links 285A, 285B is attached to corresponding lateral clevises, which in the example shown are lateral walls 240 of front clevises 220. Similarly, each rear lateral lug 145 is attached to a first end of a corresponding rear link 290A, 290B with retaining members 75 and a second end of rear links 490A, 490B is attached to corresponding lateral clevises, which in the example shown are lateral walls 265 of rear clevises 245.

Referring to FIGS. 11-17, a second example connection between aircraft fuselage 15 and multi-spar box 40 of vertical stabilizer 35 is shown. As best seen in FIGS. 11-12, a base rib assembly 300 has a base rib 305 and a front terminal fitting 310, rear terminal fitting 315 opposite front terminal fitting 310, first side chord 320, and second side chord 325 opposite first side chord 320, attached to base rib 305. Front terminal fitting 310 includes a pair of opposing front longitudinal lugs 330 extending parallel to a longitudinal axis A of base rib assembly 300 and a pair of front lateral lugs 335 extending perpendicular to longitudinal axis A and positioned between the pair of front longitudinal lugs 330. As shown, front terminal fitting 310 is a single, unitary piece having both front longitudinal lugs 330 and front lateral lugs 335, but could also be two pieces, each having one front longitudinal lug 330 and one front lateral lug 335, as shown in FIGS. 4-5. Rear terminal fitting 315 includes a pair of opposing rear longitudinal lugs 340 extending parallel to longitudinal axis A and a pair of rear lateral lugs 345 extending perpendicular to longitudinal axis A and positioned between the pair of rear longitudinal lugs 340. As shown, rear terminal fitting 315 is a single unitary piece having both rear longitudinal lugs 340 and both rear lateral lugs 345, but could also be two pieces, each having one rear longitudinal lug 340 and one rear lateral lug 345. First side chord 320 has at least one first middle longitudinal lug 350 extending parallel to longitudinal axis A and second side chord 325 has at least one second middle longitudinal lug 355, opposite first longitudinal lug 350. As shown, first side chord 320 has two first longitudinal lugs 350 and second side chord 325 has two second longitudinal lugs 355, however, first and second side chords 320, 325 can have any number of longitudinal lugs desired for a particular application. In addition, in the particular example shown, there are no lateral lugs positioned between first longitudinal lugs 350 and second longitudinal lugs 355. Therefore, in the example shown in FIGS. 11-17, base rib assembly 300 has a pair of opposing front longitudinal lugs 330, a pair of opposing rear longitudinal lugs 340, at least one pair of opposing middle longitudinal lugs 350, 355 disposed between front longitudinal lugs 330 and rear longitudinal lugs 340, a pair of front lateral lugs 335 disposed between front longitudinal lugs 330, and a pair of rear lateral lugs 345 disposed between rear longitudinal lugs 340.

Figure 13:
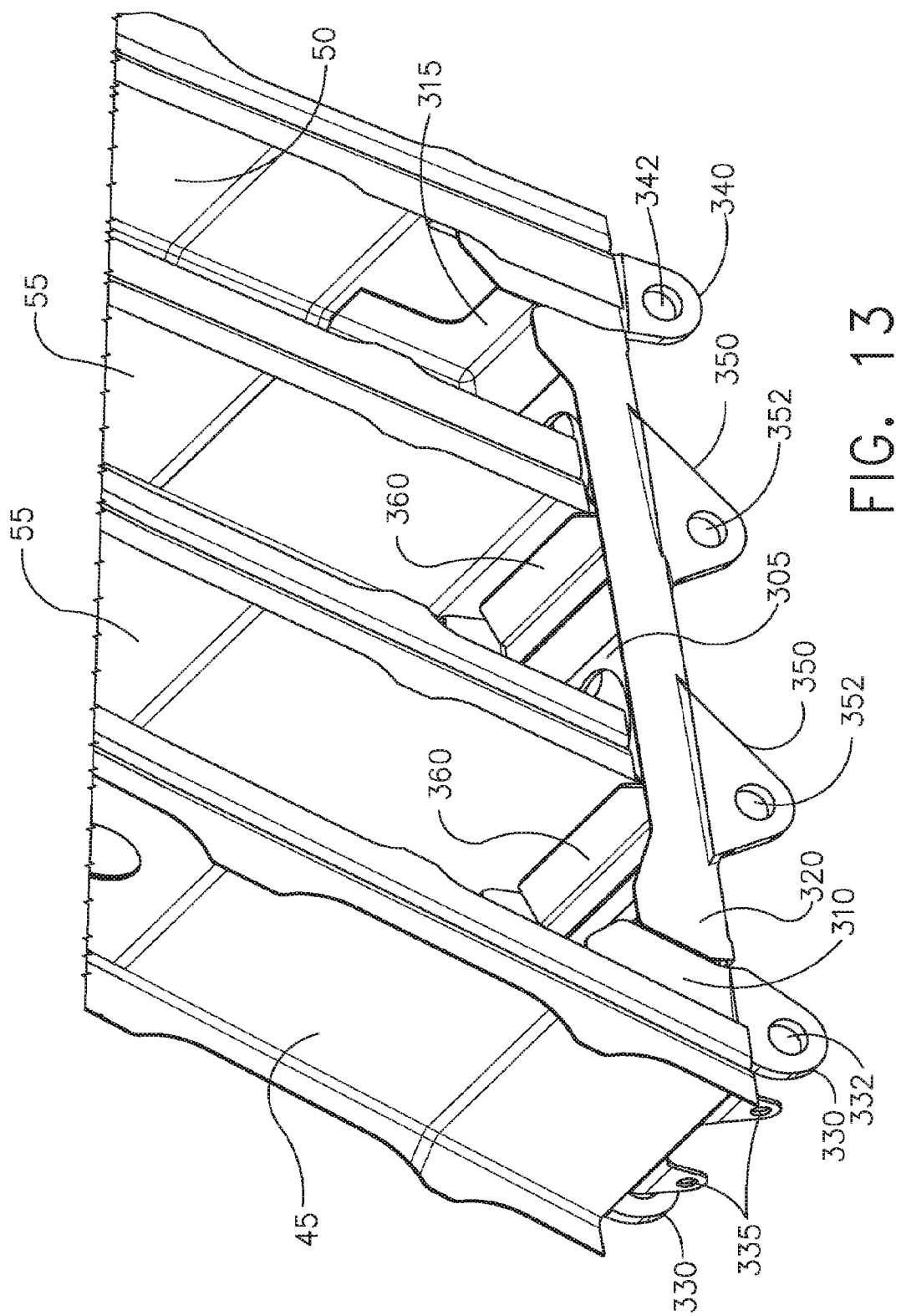
FIG. 13 is an illustration of a front perspective view of a base rib assembly positioned within the multi-spar box with a side skin removed in accordance with an illustrative embodiment.
Figure 14:
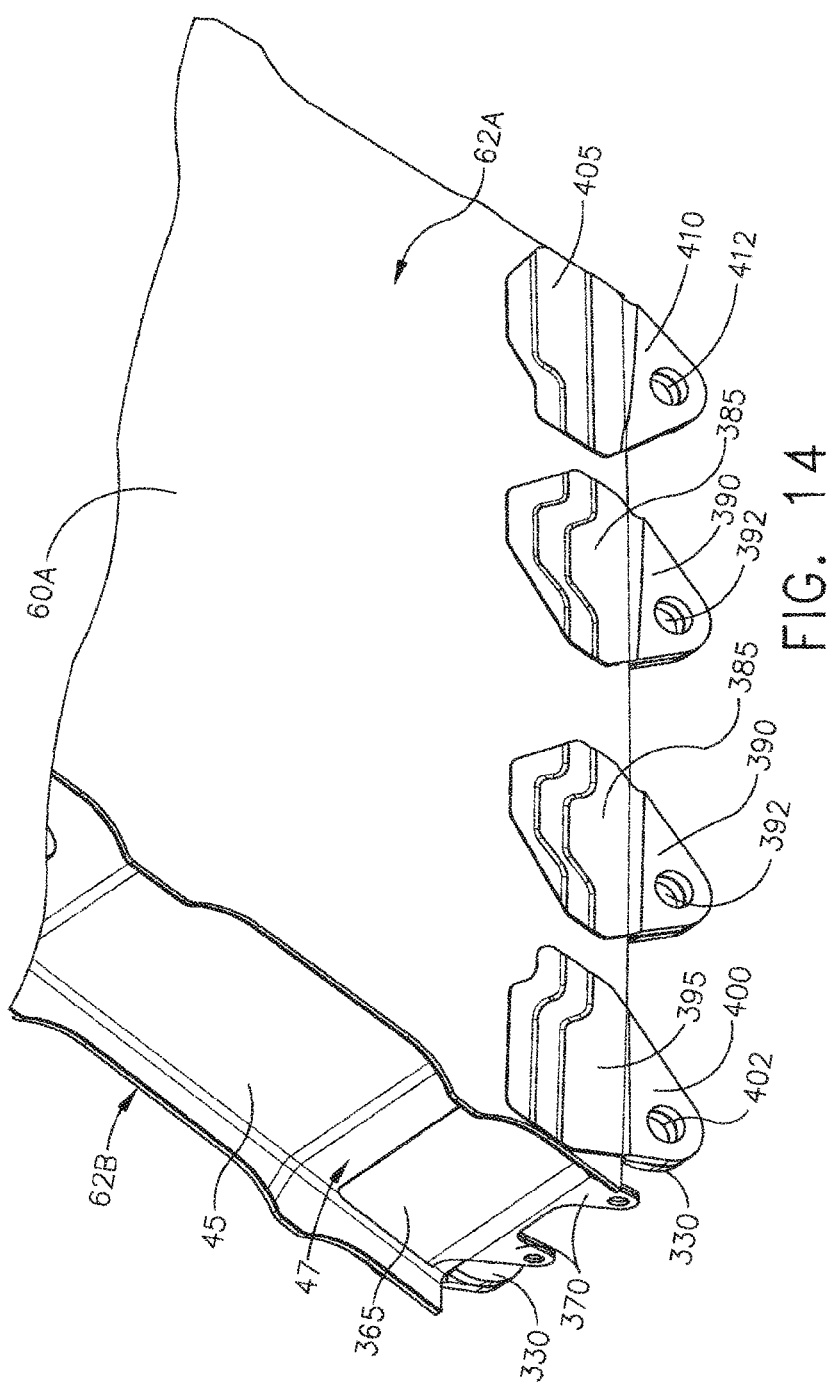
FIG. 14 is an illustration of a front perspective view of a base rib assembly fully assembled with a multi-spar box in accordance with an illustrative embodiment.

As seen in FIGS. 13-14, base rib assembly 300 is positioned in interior 65 of multi-spar box 40 and secured to multi-spar box 40. For example, front terminal fitting 310 of base rib assembly 300 can be secured to front spar 45 of multi-spar box 40 with screws, bolts, welding, or any other well-known securement method. Similarly, rear terminal fitting 315 can be secured to rear spar 50 with screws, bolts, welding, or any other well-known securement method. In addition, mid spars 55 can be secured to base rib assembly 300 by attaching L-shaped shear clips 360 between base rib 305 and/or first and second side chords 320, 325 of base rib assembly 300 and mid spars 55 with screws, bolts, welding, or any other well-known securement method.

Referring to FIG. 14, with base rib assembly 300 positioned in multi-spar box 40, a front plate 365 is positioned adjacent exterior surface 47, or adjacent an interior surface, of front spar 45 and is secured to front spar 45 and base rib assembly 300, for example, by screws that are threaded through front plate 365, front spar 45, and front terminal fitting 310 of base rib assembly 300. Alternatively, front plates 365 can be secured to second front spar 45 and base rib assembly 300 by bolts, welding, or any other well-known securement method. Front plate 365 includes lateral lugs 370 that correspond to each of the front lateral lugs 335 of front terminal fitting 310 and that are adjacent to and aligned with corresponding front lateral lugs 335. As shown, front plate 365 is a single, unitary piece including both lateral lugs 370, but could also be two or more pieces, each having a single lateral lug 370 that corresponds to a front lateral lug 335. Similarly, a rear plate 375 is positioned adjacent exterior surface 52, or adjacent an interior surface, of rear spar 50, opposite front plate 365, and is secured to rear spar 50 and base rib assembly 300, for example, by screws that are threaded through rear plate 375, rear spar 50, and rear terminal fitting 315 of base rib assembly 300. Alternatively, rear plate 375 can be secured to rear spar 50 and base rib assembly 300 by bolts, welding, or any other well-known securement method. Rear plate 375 includes lateral lugs 380 that correspond to each of the rear lateral lugs 345 of rear terminal fitting 315 and that are adjacent to and aligned with corresponding rear lateral lugs 345. As shown, rear plate 375 is a single, unitary piece including both lateral lugs 380, but could also be two or more pieces, each having a single lateral lug 380 that corresponds to a rear lateral lug 345.

First side plates 385 are positioned adjacent exterior surface 62A of first side skin 60A and are secured to first side skin 60A and base rib assembly 300, for example, by screws that are threaded through first side plates 385, first side skin 60A, and first side chord 320. Alternatively, first side plates 385 can be secured to first side skin 60A and base rib assembly 300 by bolts, welding, or any other well-known securement method. Each first side plate 385 includes a longitudinal lug 390 that is adjacent to and aligned with a corresponding first middle longitudinal lug 350. In the example shown, there are two first side plates 385 since there are two first middle longitudinal lugs 350. However, there could be any number of first side plates 385 as required for the number of first middle longitudinal lugs 350. In addition, rather than individual first side plates 385, a single, unitary piece first side plate could be used that has multiple longitudinal lugs that each correspond to a first middle longitudinal lug. Corresponding second side plates (not shown) are also positioned adjacent exterior surface 62B of second side skin 60B, opposite corresponding first side plates 385, and are secured to second side skin 60B and base rib assembly 300, for example, by screws that are threaded through the second side plates, second side skin 60B, and second side chord 325. Alternatively, second side plates can be secured to second side skin 60B and base rib assembly 300 by bolts, welding, or any other well-known securement method. Each second side plate includes a longitudinal lug that is adjacent to and aligned with a corresponding second middle longitudinal lug 355. As with first side plates 385, there could be any number of second side plates as required for the number of second middle longitudinal lugs 355 or, rather than individual second side plates, a single, unitary piece second side plate could be used that has multiple longitudinal lugs that each correspond to a second middle longitudinal lug 355.

Third side plate 395 is positioned adjacent exterior surface 62A of first side skin 60A and is secured to first side skin 60A and base rib assembly 300, for example, by screws that are threaded through third side plate 395, first side skin 60A, and front terminal fitting 310. Alternatively, third side plates 395 can be secured to first side skin 60A and base rib assembly 300 by bolts, welding, or any other well-known securement method. Third side plate 395 includes a longitudinal lug 400 that is adjacent to and aligned with a corresponding front longitudinal lug 330. Corresponding fourth side plate (not shown) is also positioned adjacent exterior surface 62B of second side skin 60B, opposite corresponding third side plate 395, and is secured to second side skin 60B and base rib assembly 300, for example, by screws that are threaded through the fourth side plate, second side skin 60B, and front terminal fitting 310. Alternatively, fourth side plates can be secured to second side skin 60B and base rib assembly 300 by bolts, welding, or any other well-known securement method. Fourth side plate includes a longitudinal lug that is adjacent to and aligned with a corresponding front longitudinal lug 330.

Fifth side plate 405 is positioned adjacent exterior surface 62A of first side skin 60A and is secured to first side skin 60A and base rib assembly 300, for example, by screws that are threaded through fifth side plate 405, first side skin 60A, and rear terminal fitting 315. Alternatively, fifth side plates 405 can be secured to first side skin 60A and base rib assembly 300 by bolts, welding, or any other well-known securement method. Fifth side plate 405 includes a longitudinal lug 410 that is adjacent to and aligned with a corresponding rear longitudinal lug 340. Corresponding sixth side plate (not shown) is also positioned adjacent exterior surface 62B of second side skin 60B, opposite corresponding fifth side plates 405, and is secured to second side skin 60B and base rib assembly 300, for example, by screws that are threaded through the sixth side plate, second side skin 60B, and rear terminal fitting 315. Alternatively, sixth side plates can be secured to second side skin 60B and base rib assembly 300 by bolts, welding, or any other well-known securement method. Sixth side plate includes a longitudinal lug that is adjacent to and aligned with a corresponding rear longitudinal lug 340.

Figure 15:
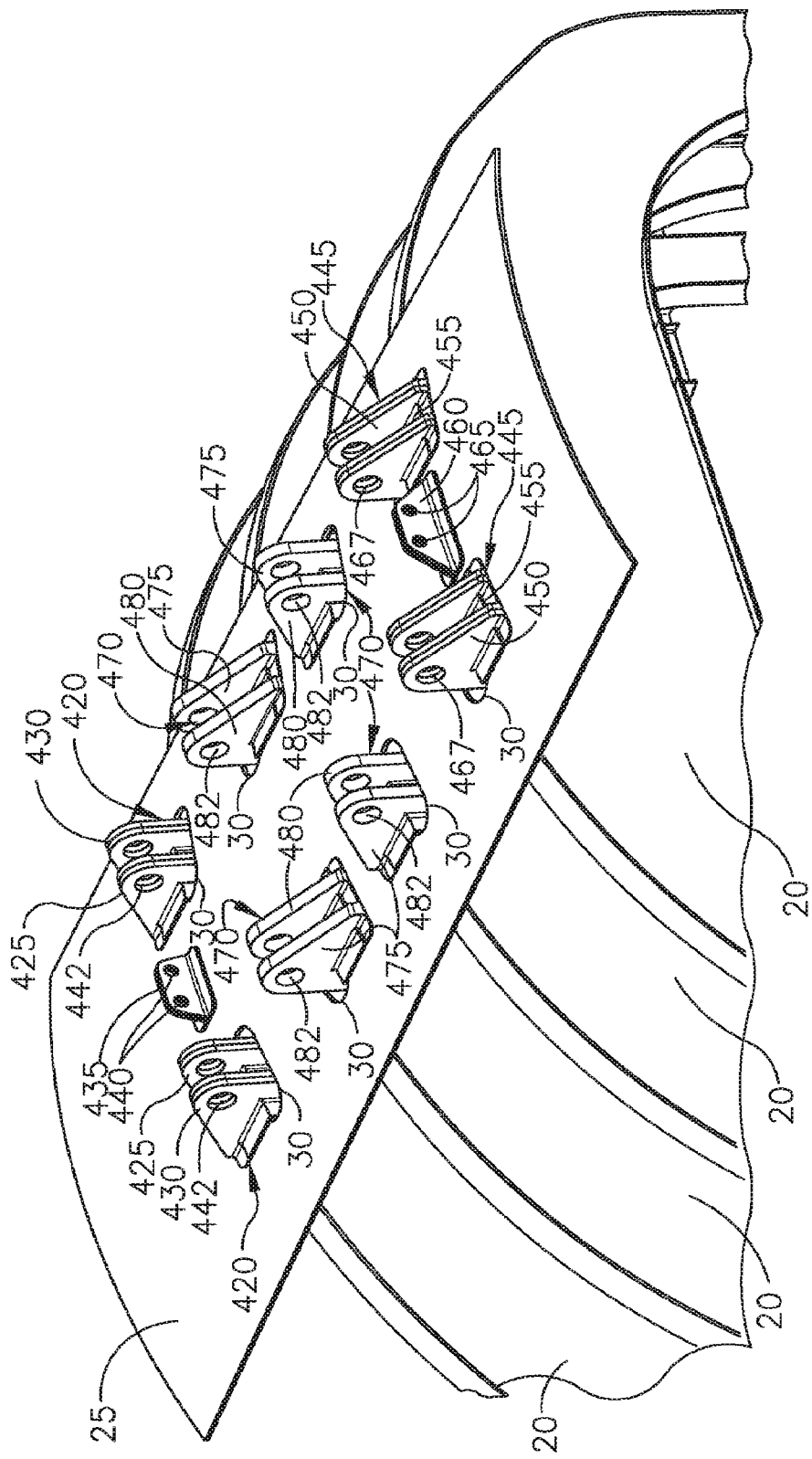
FIG. 15 is an illustration of a portion of a fuselage of am aircraft with a second set of exemplary clevises in accordance with an illustrative embodiment.

Referring to FIG. 15, a pair of front clevises 420 correspond to the pair of front longitudinal lugs 330 and each front clevis 420 extends through a corresponding aperture 30 in outer skin 25 and is secured to a frame member 20 of aircraft fuselage 15. In the example shown, front clevises 420 each have first and second mounting arms 425, 430. Similarly, a pair of rear clevises 445 correspond to the pair of rear longitudinal lugs 340 and each rear clevis 445 extends through a corresponding aperture 30 in outer skin 25 and is secured to a frame member 20 of aircraft fuselage 15. In the example shown, rear clevises 445 each have first and second mounting arms 450, 455. Pairs of middle clevises 470 correspond to the pairs of middle longitudinal lugs 350, 355 and each middle clevis 470 extends through a corresponding aperture 30 in outer skin 25 and is secured to a frame member 20 of aircraft fuselage 15. Middle clevises 470 each have first and second mounting arms 475, 480. A front lateral clevis 435 is positioned between the pair of front clevises 420 and extends through a corresponding aperture 30 in outer skin 25 and is secured to a frame member 20 of aircraft fuselage 15. A rear lateral clevis 460 is positioned between the pair of rear clevises 445 and extends through a corresponding aperture 30 in outer skin 25 and is secured to a frame member 20 of aircraft fuselage 15.

Figure 16:
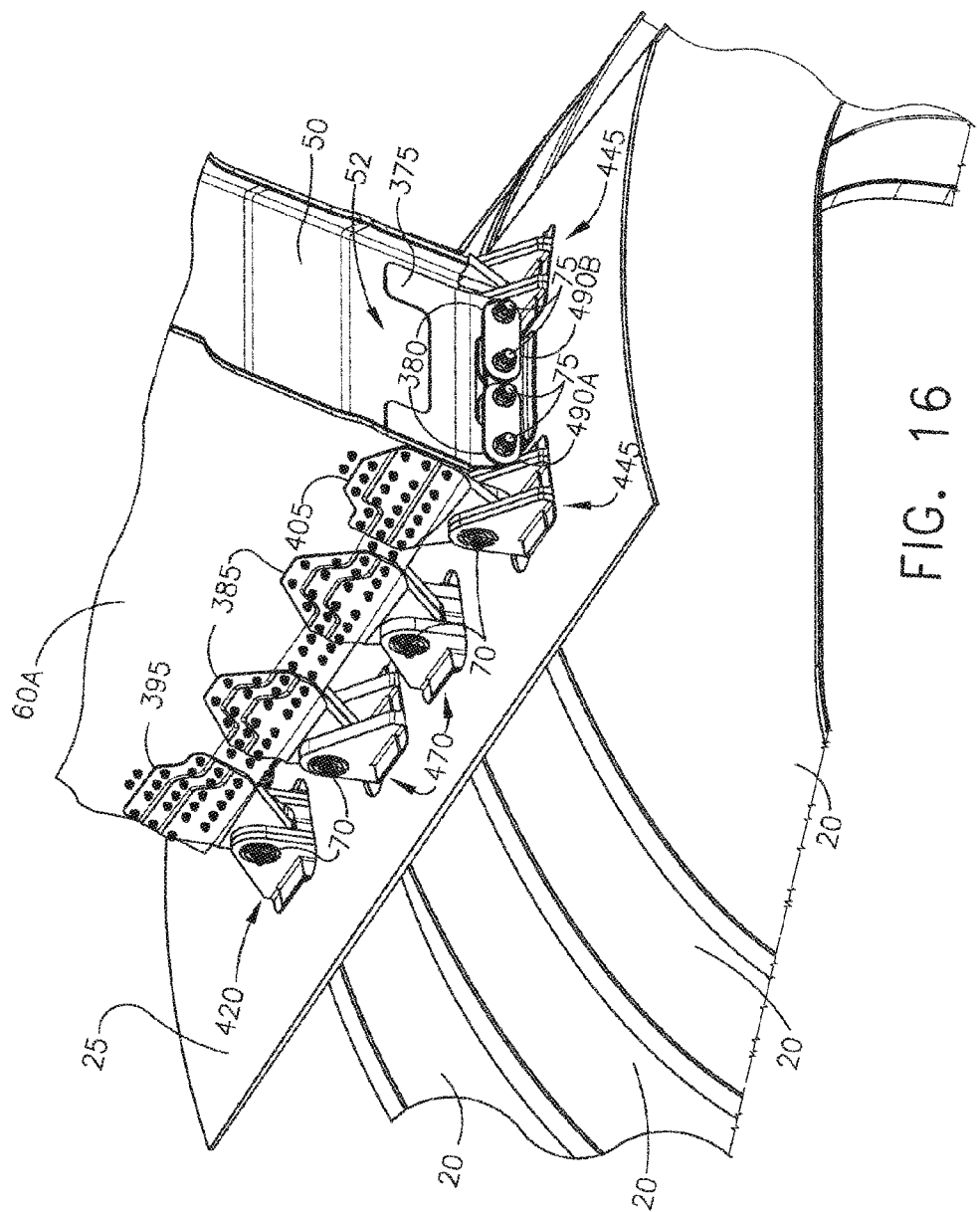
FIG. 16 is an illustration of a rear perspective view of a multi-spar box and base rib assembly connected to a fuselage in accordance with an illustrative embodiment.
Figure 17:
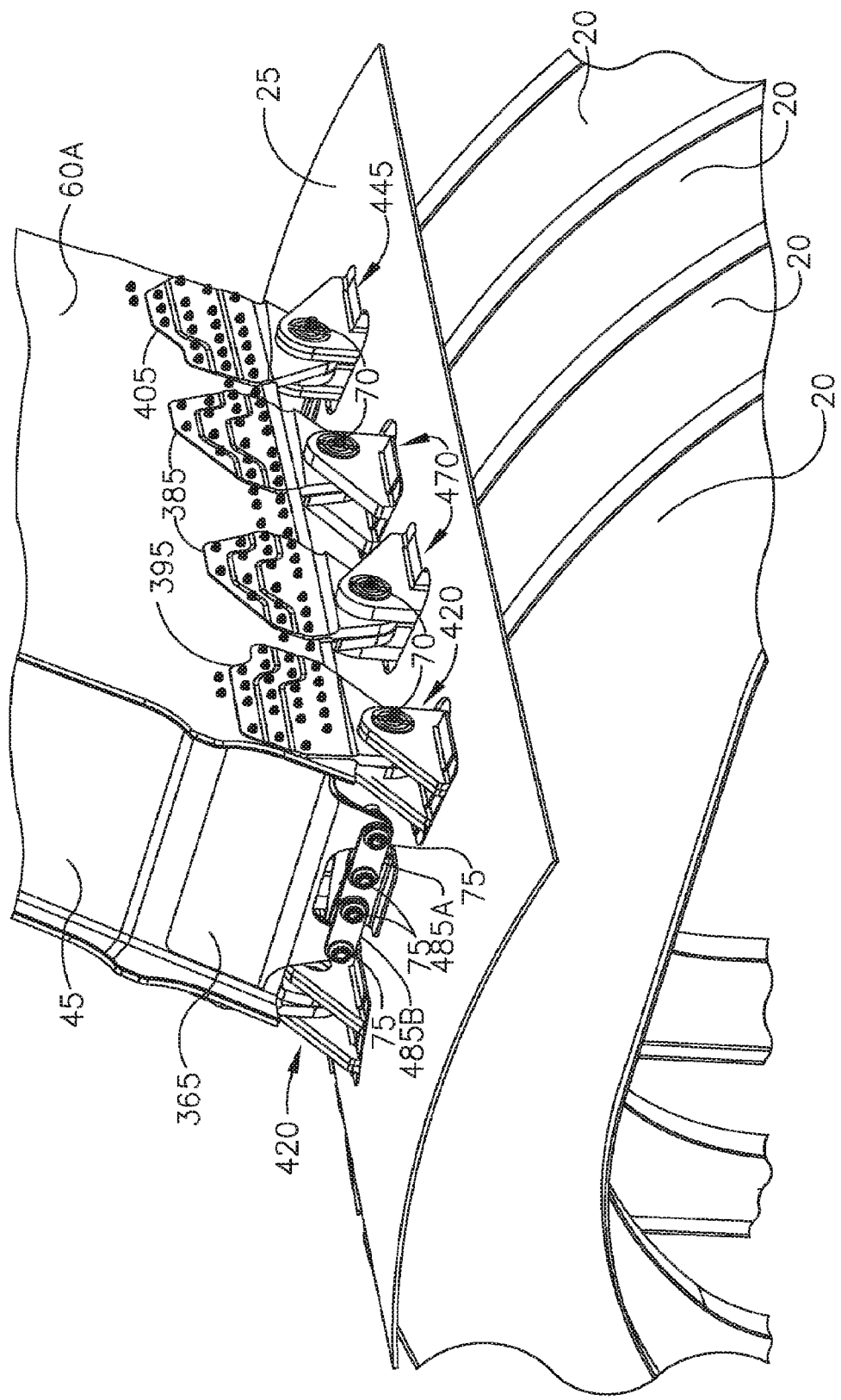
FIG. 17 is an illustration of a front perspective view of a multi-spar box, base rib assembly, and fuselage in accordance with an illustrative embodiment.

Referring to FIGS. 16-17, longitudinal lugs 390 of first side plates 385 and corresponding first middle longitudinal lugs 350 of base rib assembly 300 are positioned between first mounting arm 475 and second mounting arm 480 of the corresponding middle clevis 470 and longitudinal lugs of second side plates (now shown) and corresponding second middle longitudinal lugs 355 of base rib assembly 300 are positioned between first mounting arm 475 and second mounting arm 480 of the corresponding middle clevis 470. Retaining members 70, such as bolts, pins, etc., are inserted through mounting holes 352, 357 in each middle longitudinal lug 350, 355, mounting holes 392 in first side plate 385 and second side plate, and mounting holes 482 in each mounting arm 475, 480 of each corresponding middle clevis 470 to secure vertical stabilizer 35 to aircraft fuselage 15.

In addition, longitudinal lug 400 of third side plate 395 and corresponding front longitudinal lug 330 of base rib assembly 300 are positioned between first mounting arm 425 and second mounting arm 430 of the corresponding front clevis 420. The longitudinal lug of the fourth side plate and the corresponding front longitudinal lug 330 of base rib assembly 300 are similarly positioned between first mounting arm 425 and second mounting arm 430 of the corresponding front clevis 420. Retaining members 70, such as bolts, pins, etc., are inserted through mounting holes 332 in each front longitudinal lug 330, mounting holes 402 in third side plate 395 and fourth side plate, and mounting holes 442 in each mounting arm 425, 430 of each corresponding front clevis 420 to secure vertical stabilizer 35 to aircraft fuselage 15.

Similarly, longitudinal lug 410 of fifth side plate 405 and the corresponding rear longitudinal lug 340 of base rib assembly 300 are positioned between first mounting arm 450 and second mounting arm 455 of the corresponding rear clevis 445. The longitudinal lug of the sixth side plate and the corresponding rear longitudinal lug 340 of base rib assembly 300 are similarly positioned between first mounting arm 450 and second mounting arm 455 of the corresponding rear clevis 445. Retaining members 70 such as bolts, pins, etc., are inserted through mounting holes 342 in each rear longitudinal lug 340, mounting holes 412 in fifth side plate 405 and sixth side plate, and mounting holes 467 in each mounting arm 450, 455 of each corresponding rear clevis 445 to secure vertical stabilizer 35 to aircraft fuselage 15.

To provide lateral support for vertical stabilizer 35, first and second front links 485A, B interconnect each of the pair of front lateral lugs 335 of front terminal fitting 310 and front lateral clevis 435 via retaining members 75, such as bolts, pins, etc., that extend through mounting holes 337 in front lateral lugs 335 and mounting holes 440 in front lateral clevis 435. Similarly, first and second rear links 490A, B interconnect each of the pair of rear lateral lugs 345 of rear terminal fitting 315 and rear lateral clevis 460 via retaining members 75, such as bolts, pins, etc., that extend through mounting holes 347 in rear lateral lugs 345 and mounting holes 465 in rear lateral clevis 460.

To attach vertical stabilizer 35 to aircraft fuselage 15 as discussed above, base rib assembly 300 is first assembled, which, as discussed above, has a pair of opposing front longitudinal lugs 330, a pair of opposing rear longitudinal lugs 340, at least one pair of opposing middle longitudinal lugs 350, 355 between front longitudinal lugs 330 and rear longitudinal lugs 340, and pairs of front and rear lateral lugs 335, 345, each of which have a corresponding mounting hole 332, 342, 352,357,337,347. To assemble base rib assembly 300, first side chord 320 is attached to base rib 305, second side chord 325 is attached to base rib 305, opposite first side chord 320, front terminal fitting 310 is attached to base rib 305, and rear terminal fitting 315 is attached to base rib 305, opposite front terminal fitting 310. Base rib assembly 300 is then inserted into interior 65 of multi-spar box 40 of vertical stabilizer 35 and L-shaped shear clips 360 are attached between mid spars 55 and base rib assembly 300.

Front plate 365 is then positioned adjacent exterior surface 47, or adjacent an interior surface, of front spar 45 and is secured to front spar 45 and base rib assembly 300, rear plate 375 is positioned adjacent exterior surface 52, or adjacent an interior surface, of rear spar 50, opposite front plate 365, and is secured to rear spar 50 and base rib assembly 300, first side plate 385 is positioned adjacent exterior surface 62A of first side skin 60A of multi-spar box 40 and is secured to first side skin 60A and base rib assembly 300, and the second side plate is positioned adjacent exterior surface 62B of second side skin 60B of multi-spar box 40 and is secured to second side skin 60B and base rib assembly 300.

Front clevises 420, rear clevises 445, and middle clevises 470 are inserted through corresponding apertures 30 in outer skin 25 of aircraft fuselage 15 and are secured to corresponding frame member 20 of aircraft fuselage 15, for example, with bolts, screws, rivets, welding, etc. Front clevises 420 correspond to front longitudinal lugs 330 and each have first and second mounting arms 425, 430 with mounting holes 442 and rear clevises 445 correspond to rear longitudinal lugs 340 and each have first and second mounting arms 450, 455 with mounting holes 467. Middle clevises 470 correspond to middle longitudinal lugs 350, 355 and each have first and second mounting arms 475, 480 with mounting holes 482.

Vertical stabilizer 35 is then positioned adjacent aircraft fuselage 15 such that each front, rear, and middle longitudinal lug 330, 340, 350, 355 is aligned with a corresponding front, rear, or middle clevis 420, 445, 470 and retaining members 70 are inserted through mounting holes 332, 342, 352, 357 of each longitudinal lug 330, 340, 350, 355 and mounting holes 442, 467, 482 of each corresponding clevis 420, 445, 470 to secure vertical stabilizer 35 to aircraft fuselage 15. Each front lateral lug 335 is attached to a first end of a corresponding front link 485A, 485B with retaining members 75 and a second end of front links 485A, 485B is attached to front lateral clevis 435 with retaining members 75. Similarly, each rear lateral lug 345 is attached to a first end of a corresponding rear link 490A, 490B with retaining members 75 and a second end of rear links 490A, 490B is attached to rear lateral clevis 460 with retaining members 75.

Figure 18:
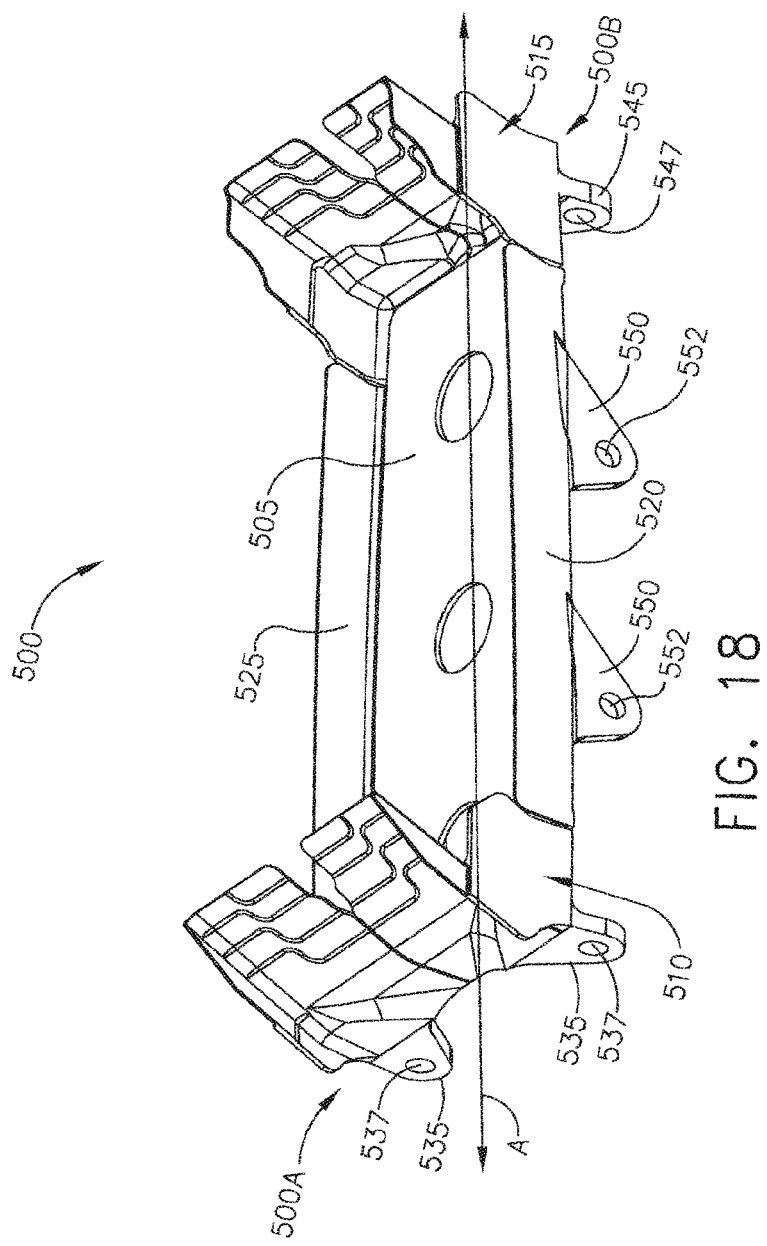
FIG. 18 is an illustration of a front perspective view of a third example base rib assembly in accordance with an illustrative embodiment.
Figure 19:
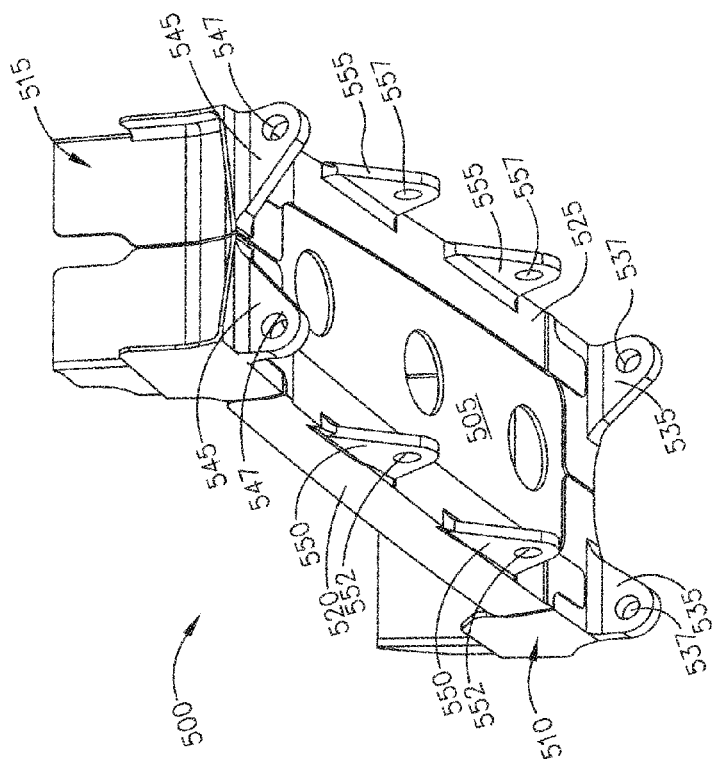
FIG. 19 is an illustration of a rear perspective view of a base rib assembly in accordance with an illustrative embodiment.

Referring to FIGS. 18-24, a third example connection between aircraft fuselage 15 and multi-spar box 40 of vertical stabilizer 35 is shown. As best seen in FIGS. 18-19, a base rib assembly 500 has a base rib 505 and a front terminal fitting 510, rear terminal fitting 515 opposite front terminal fitting 510, first side chord 520, and second side chord 525 opposite first side chord 520, attached to base rib 505. Front terminal fitting 510 includes a pair of front lateral lugs 535 extending perpendicular to longitudinal axis A. As shown, front terminal fitting 110 is two pieces, each having one front lateral lug 535, but could also be a single, unitary piece having both front lateral lugs 535, as shown and described in previous examples. Rear terminal fitting 515 includes a pair of rear lateral lugs 545 extending perpendicular to longitudinal axis A. As shown, rear terminal fitting 515 is two pieces, each having one rear lateral lug 545, but could also be a single unitary piece having both rear lateral lugs 545, as shown and described in previous examples. First side chord 520 has at least one first middle longitudinal lug 550 extending parallel to longitudinal axis A and second side chord 525 has at least one second middle longitudinal lug 555, opposite first longitudinal lug 550. As shown, first side chord 520 has two first longitudinal lugs 550 and second side chord 525 has two second longitudinal lugs 555, however, first and second side chords 520, 525 can have any number of longitudinal lugs desired for a particular application. In addition, in the particular example shown, there are no lateral lugs positioned between first longitudinal lugs 550 and second longitudinal lugs 555. Therefore, in the example shown in FIGS. 18-19, base rib assembly 500 has at least one pair of opposing middle longitudinal lugs 550, 555 disposed between a front 500A of base rib assembly 500 and a rear 500B of base rib assembly 500, a pair of front lateral lugs 535 positioned along front 500A of base rib assembly 500, and a pair of rear lateral lugs 545 positioned along rear 500B of base rib assembly 500.

Figure 20:
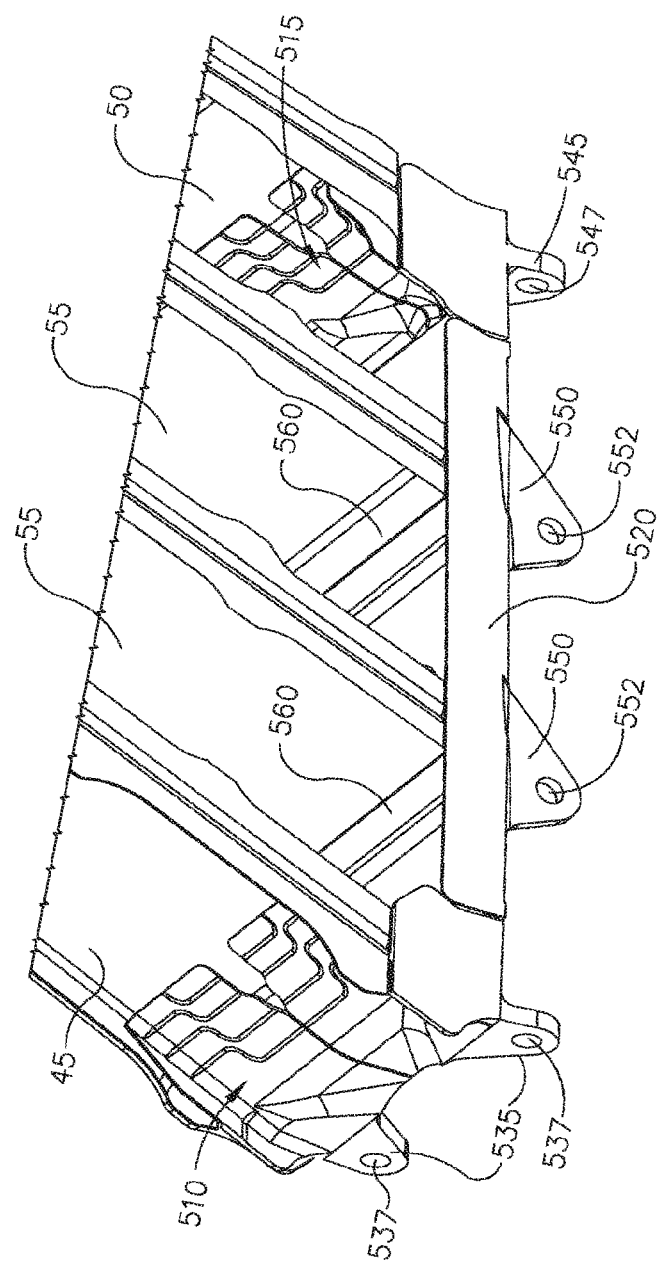
FIG. 20 is an illustration of a front perspective view of a base rib assembly positioned within the multi-spar box with a side skin removed in accordance with an illustrative embodiment.
Figure 21:
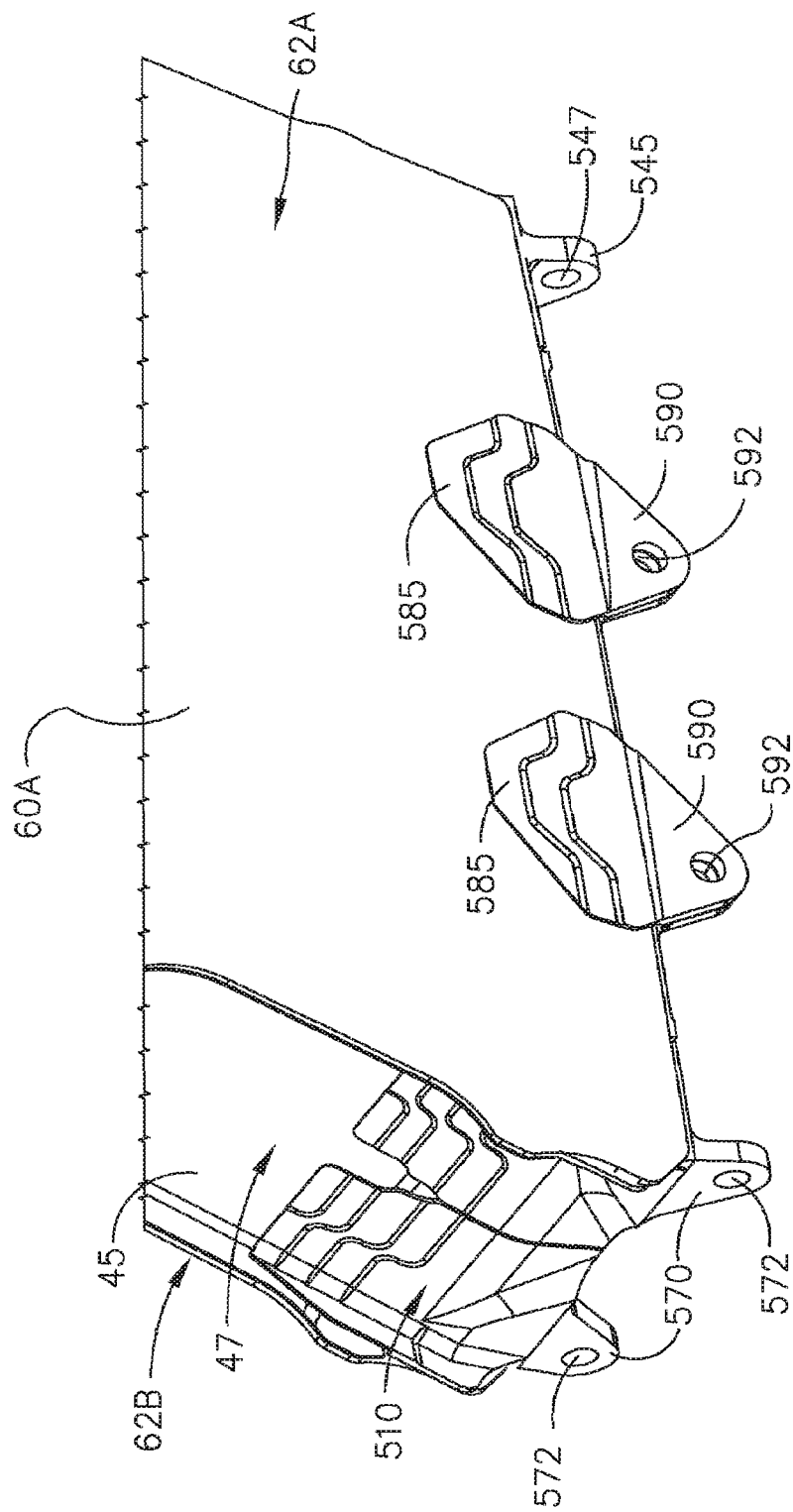
FIG. 21 is an illustration of a front perspective view of a base rib assembly fully assembled with a multi-spar box in accordance with an illustrative embodiment.

As seen in FIGS. 20-21, base rib assembly 500 is positioned in interior 65 of multi-spar box 40 with first side chord 520 positioned inside first side skin 60A, second side chord 525 positioned inside second side skin 60B, front terminal fitting 510 positioned adjacent exterior surface 47, or an interior surface, of front spar 45, and rear terminal fitting 515 positioned adjacent an interior surface, or exterior surface 52, of rear spar 50 and base rib assembly 500 secured to multi-spar box 40. For example, front terminal fitting 510 of base rib assembly 500 can be secured to front spar 45 of multi-spar box 40 with screws, bolts, welding, or any other well-known securement method. Similarly, rear terminal fitting 515 can be secured to rear spar 50 with screws, bolts, welding, or any other well-known securement method. In addition, mid spars 55 can be secured to base rib assembly 500 by attaching L-shaped shear clips 560 between base rib 505 and/or first and second side chords 520, 525 of base rib assembly 500 and mid spars 55 with screws, bolts, welding, or any other well-known securement method.

Referring to FIG. 21, with base rib assembly 500 positioned in multi-spar box 40 as described above, first side plates 585 are positioned adjacent exterior surface 62A of first side skin 60A and are secured to first side skin 60A and base rib assembly 500, for example, by screws that are threaded through first side plates 585, first side skin 60A, and first side chord 520. Alternatively, first side plates 585 can be secured to first side skin 60A and base rib assembly 500 by bolts, welding, or any other well-known securement method. Each first side plate 585 includes a longitudinal lug 590 that is adjacent to and aligned with a corresponding first middle longitudinal lug 550. In the example shown, there are two first side plates 585 since there are two first middle longitudinal lugs 550. However, there could be any number of first side plates 585 as required for the number of first middle longitudinal lugs 550. In addition, rather than individual first side plates 585, a single, unitary piece first side plate could be used that has multiple longitudinal lugs that each correspond to a first middle longitudinal lug. Corresponding second side plates (not shown) are also positioned adjacent exterior surface 62B of second side skin 60B, opposite corresponding first side plates 585, and are secured to second side skin 60B and base rib assembly 500, for example, by screws that are threaded through the second side plates, second side skin 60B, and second side chord 525. Alternatively, second side plates can be secured to second side skin 60B and base rib assembly 500 by bolts, welding, or any other well-known securement method. Each second side plate includes a longitudinal lug that is adjacent to and aligned with a corresponding second middle longitudinal lug 555. As with first side plates 585, there could be any number of second side plates as required for the number of second middle longitudinal lugs 555 or, rather than individual second side plates, a single, unitary piece second side plate could be used that has multiple longitudinal lugs that each correspond to a second middle longitudinal lug 555.

Figure 22:
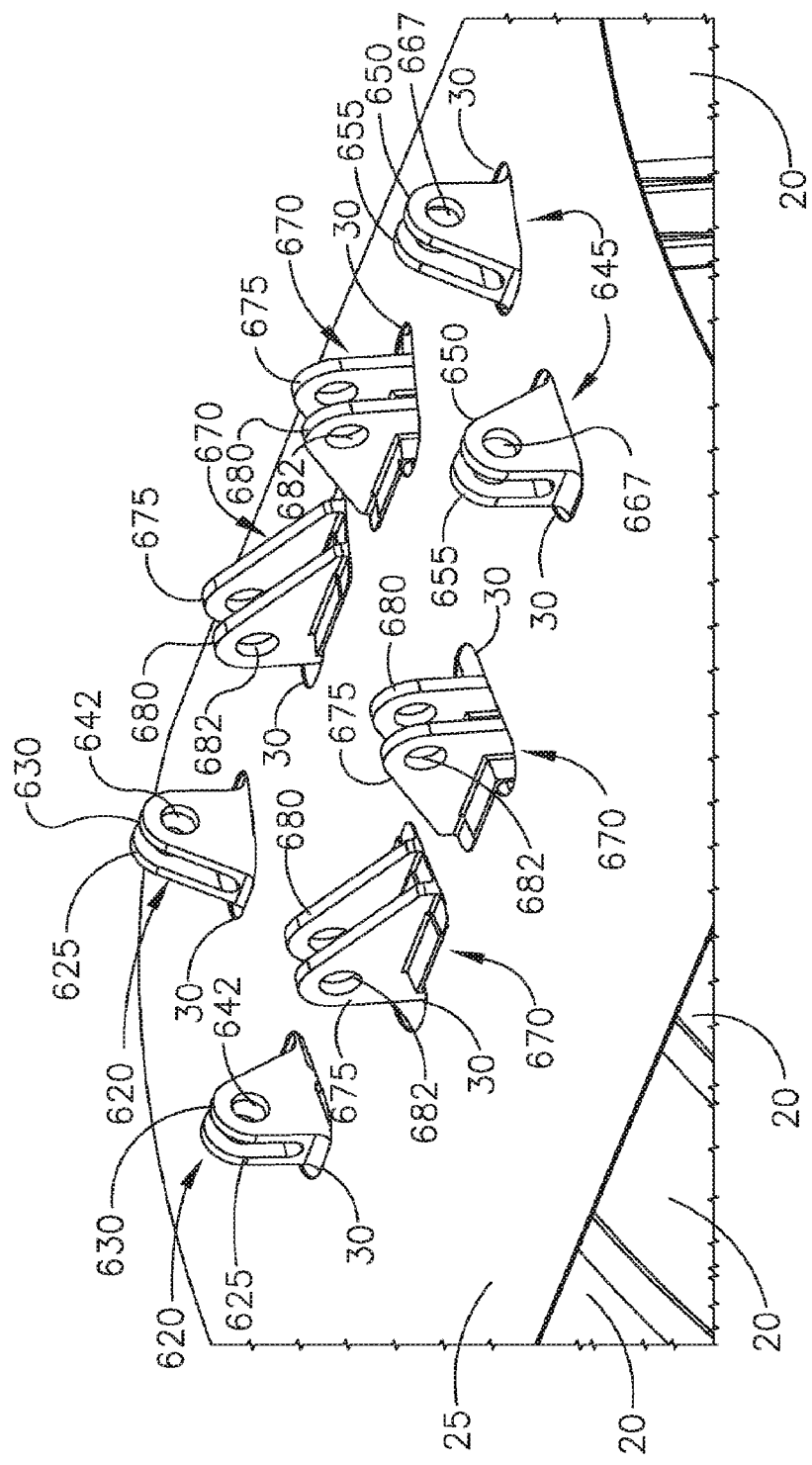
FIG. 22 is an illustration of a portion of the fuselage of an aircraft with a third set of exemplary clevises in accordance with an illustrative embodiment.

Referring to FIG. 22, a pair of front clevises 620 correspond to the pair of front lateral lugs 535 and each front clevis 620 extends through a corresponding aperture 30 in outer skin 25 and is secured to a frame member 20 of aircraft fuselage 15. In the example shown, front clevises 620 each have first and second mounting arms 625, 630. Similarly, a pair of rear clevises 645 correspond to the pair of rear lateral lugs 545 and each rear clevis 645 extends through a corresponding aperture 30 in outer skin 25 and is secured to a frame member 20 of aircraft fuselage 15. In the example shown, rear clevises 645 each have first and second mounting arms 655, 655. Pairs of middle clevises 670 correspond to the pairs of middle longitudinal lugs 550, 555 and each middle clevis 670 extends through a corresponding aperture 30 in outer skin 25 and is secured to a frame member 20 of aircraft fuselage 15. Middle clevises 670 each have first and second mounting arms 675, 680.

Figure 23:
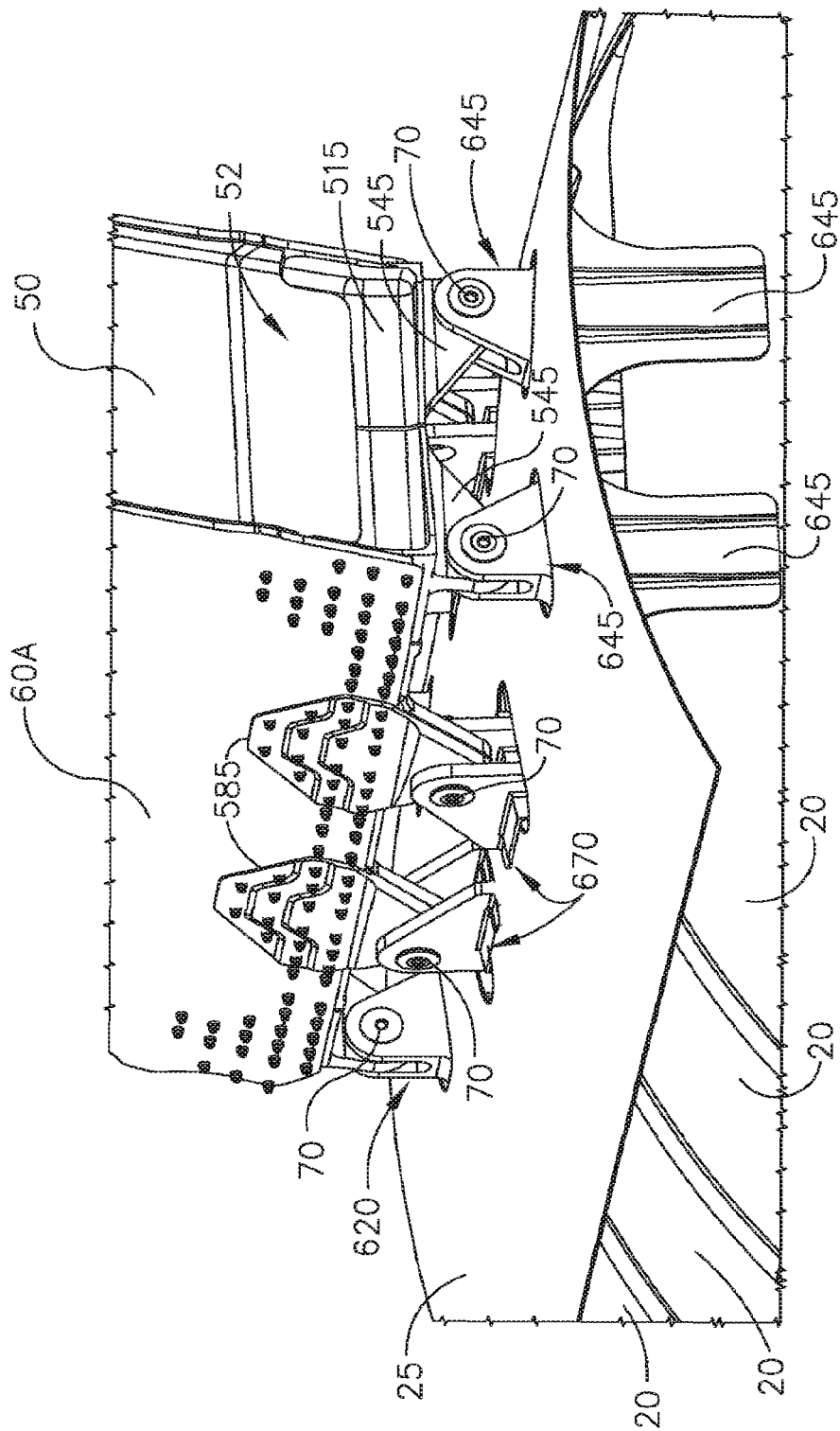
FIG. 23 is an illustration of a rear perspective view of a multi-spar box and base rib assembly connected to a fuselage in accordance with an illustrative embodiment.
Figure 24:
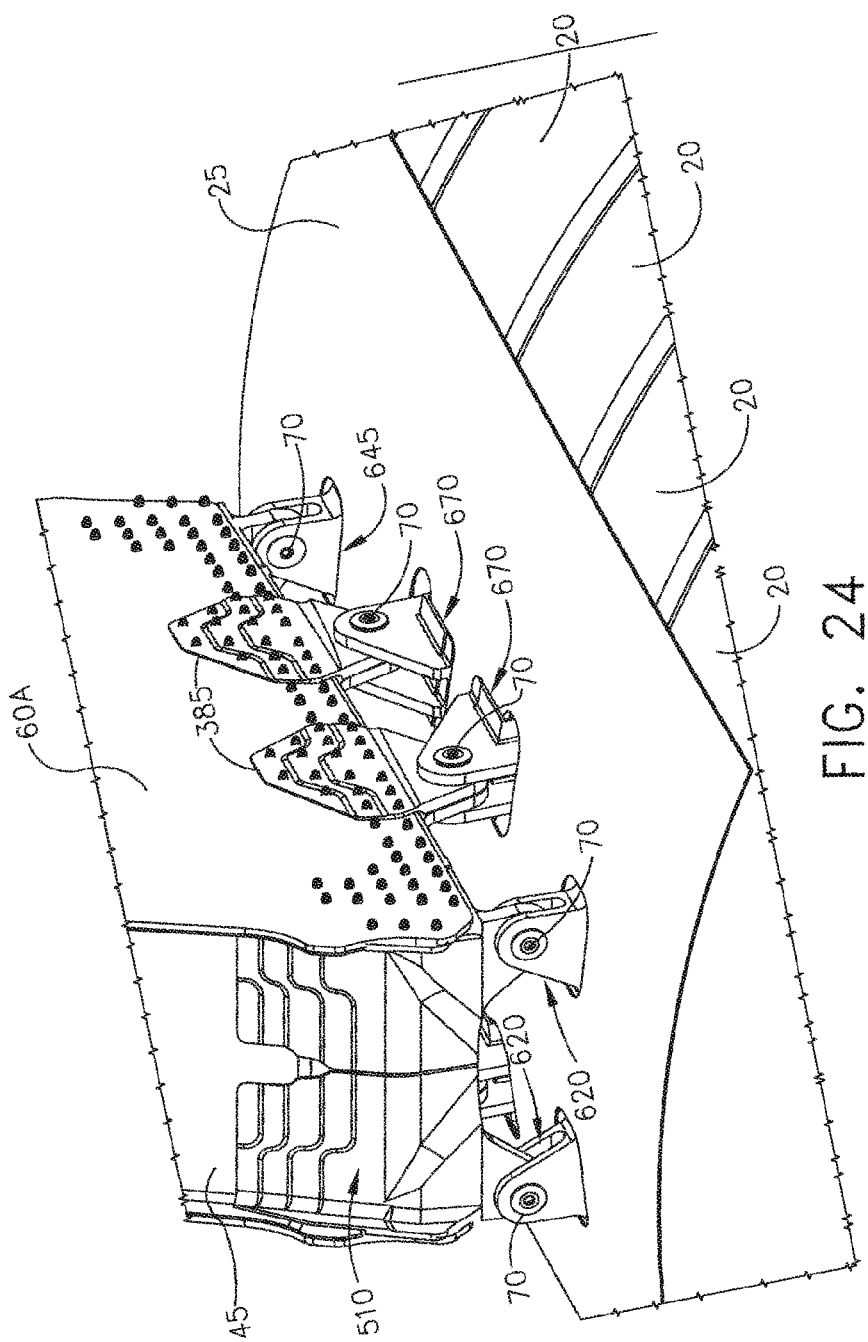
FIG. 24 is an illustration of a front perspective view of the multi-spar box, base rib assembly, and fuselage in accordance with an illustrative embodiment.

Referring to FIGS. 23-24, longitudinal lugs 590 of first side plates 585 and corresponding first middle longitudinal lugs 550 of base rib assembly 500 are positioned between first mounting arm 675 and second mounting arm 680 of the corresponding middle clevis 670 and longitudinal lugs of second side plates (now shown) and corresponding second middle longitudinal lugs 555 of base rib assembly 500 are positioned between first mounting arm 675 and second mounting arm 680 of the corresponding middle clevis 670. Retaining members 70, such as bolts, pins, etc., are inserted through mounting holes 552, 557 in each middle longitudinal lug 550, 555, mounting holes 592 in first side plate 585 and second side plate, and mounting holes 682 in each mounting arm 675, 680 of each corresponding middle clevis 670 to secure vertical stabilizer 35 to aircraft fuselage 15.

In addition, to provide lateral support for vertical stabilizer 35, front lateral lugs 535 of base rib assembly 500 are positioned between first mounting arm 625 and second mounting arm 630 of the corresponding front clevis 620. Retaining members 70, such as bolts, pins, etc., are inserted through mounting holes 537 in each front lateral lug 535 and mounting holes 642 in each mounting arm 625, 630 of each corresponding front clevis 620 to secure vertical stabilizer 35 to aircraft fuselage 15.

In addition, rear lateral lugs 545 of base rib assembly 500 are positioned between first mounting arm 655 and second mounting arm 655 of the corresponding rear clevis 645. Retaining members 70 such as bolts, pins, etc., are inserted through mounting holes 547 in each rear lateral lug 545 and mounting holes 667 in each mounting arm 655, 655 of each corresponding rear clevis 645 to secure vertical stabilizer 35 to aircraft fuselage 15.

To attach vertical stabilizer 35 to aircraft fuselage 15 as discussed above, base rib assembly 500 is first assembled, which, as discussed above, has at least one pair of opposing middle longitudinal lugs 550, 555 disposed between front 500A and rear 500B of base rib assembly 500, and pairs of front and rear lateral lugs 535, 545 disposed along front 500A and rear 500B of base rib assembly 500, respectively, each of which have a corresponding mounting hole 552, 557, 537, 547. To assemble base rib assembly 500, first side chord 520 is attached to base rib 505, second side chord 525 is attached to base rib 505, opposite first side chord 520, front terminal fitting 510 is attached to base rib 505, and rear terminal fitting 515 is attached to base rib 505, opposite front terminal fitting 510. Base rib assembly 500 is then inserted into interior 65 of multi-spar box 40 of vertical stabilizer 35 and L-shaped shear clips 560 are attached between mid spars 55 and base rib assembly 500.

First side plate 585 is then positioned adjacent exterior surface 62A of first side skin 60A of multi-spar box 40 and is secured to first side skin 60A and base rib assembly 500, and the second side plate is positioned adjacent exterior surface 62B of second side skin 60B of multi-spar box 40 and is secured to second side skin 60B and base rib assembly 500.

Front clevises 620, rear clevises 645, and middle clevises 670 are inserted through corresponding apertures 30 in outer skin 25 of aircraft fuselage 15 and are secured to corresponding frame member 20 of aircraft fuselage 15, for example, with bolts, screws, rivets, welding, etc. Front clevises 620 correspond to front lateral lugs 535 and each have first and second mounting arms 625, 630 with mounting holes 642 and rear clevises 645 correspond to rear lateral lugs 545 and each have first and second mounting arms 655, 655 with mounting holes 667. Middle clevises 670 correspond to middle longitudinal lugs 550, 555 and each have first and second mounting arms 675, 680 with mounting holes 682.

Vertical stabilizer 35 is then positioned adjacent aircraft fuselage 15 such that each front and rear lateral lug 535, 545 and middle longitudinal lug 550, 555 is aligned with a corresponding front, rear, or middle clevis 620, 645, 670 and retaining members 70 are inserted through mounting holes 537, 547, 552, 557 of each lug 535, 545, 550, 555 and mounting holes 642, 667, 682 of each corresponding clevis 620, 645, 670 to secure vertical stabilizer 35 to aircraft fuselage 15.

While various embodiments have been described above, this disclosure is not intended to be limited thereto. Variations can be made to the disclosed embodiments that are still within the scope of the appended claims.

Figure 25:
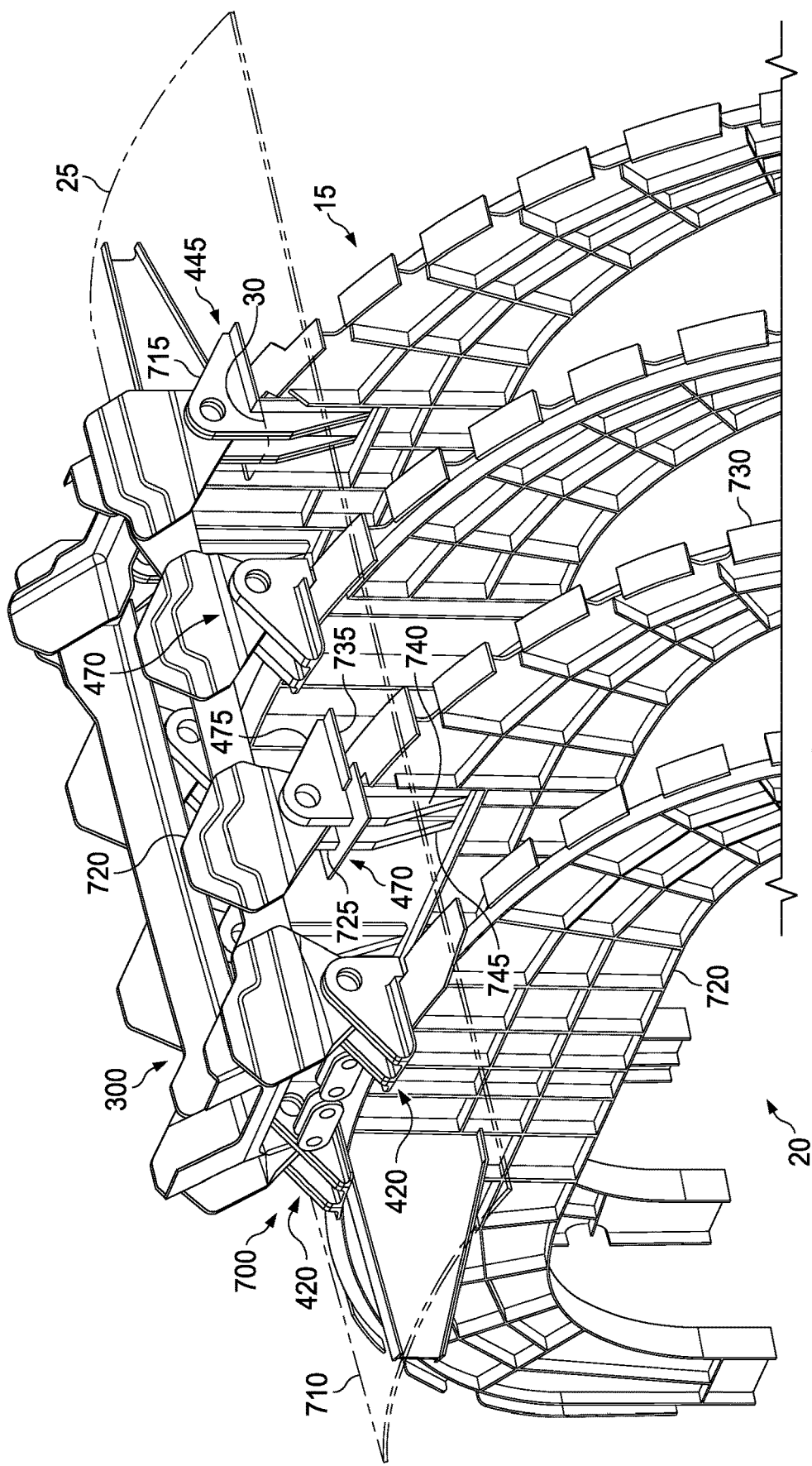
FIG. 25 is an illustration of a perspective view of a base rib assembly connected to a clevis system in an aircraft fuselage in accordance with an illustrative embodiment.

Referring next to FIG. 25, a perspective view of a base rib assembly 300 and plurality of frame members 20 is depicted in accordance with an illustrative embodiment. Vertical stabilizer 35 having multi-spar box 40 is not shown in this view. Base rib assembly 300 is connected to plurality of frame members 20 in aircraft fuselage 15 using clevis system 700.

Outer skin 25 takes the form of composite skin 710 in this illustrative example. Composite skin 710 is shown in phantom in this view. Composite skin 710 may comprise, for example, without limitation, a composite material selected from at least one of a thermoset material, a thermoplastic material, fiberglass, or some other suitable type of composite material.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In this illustrative example, clevis system 700 is inserted through aperture 30 in composite skin 710 and attached to plurality of frame members 20. Clevis system 700 collectively comprises plurality of clevises 715, namely, pair of front clevises 420, pair of rear clevises 445, and two pairs of middle clevises 470. Clevis system 700 is joined to frame members 20 in a desired manner. No shimming is required but may be optional if gaps arise. Composite skin 710 is sandwiched between each of plurality of clevises 715 and secured to aircraft fuselage 15 without additional layers of material in this illustrative example. In other words, plurality of clevises 715 is fastened directly to composite skin 710.

Plurality of clevises 715 may comprise various materials. For example, plurality of clevises 715 may comprise a metal, a metal alloy, composite material, or some combination of these materials and/or others. In some illustrative examples, plurality of clevises 715 may be formed as part of composite skin 710 such that jointing these components together may be unnecessary.

As depicted, clevis system 700 is configured to receive plurality of lugs 720 in base rib assembly 300. Plurality of lugs 720 comprises lugs shown and described in FIGS. 15-17. Retaining members 70 (not shown in this view) are inserted through corresponding mounting holes in plurality of lugs 720 and plurality of clevises 715 as described above to attach vertical stabilizer 35 with multi-spar box 40 to aircraft fuselage 15.

Attachment of plurality of clevises 715 to plurality of frame members 20 is completed outside aircraft fuselage 15. In this manner, human or robotic operators in constrained areas inside aircraft fuselage 15 and its compartments is minimized.

In this depicted example, the shape of each clevis can be seen with reference to clevis 725 in one of pair of middles clevises 470 connected to frame member 730 in plurality of frame members 20. Clevis 725 has flange 735 associated with mounting arm 475 and is flush to composite skin 710. An identical flange is located opposite to flange 735 and is associated with mounting arm 480 (not shown in this view). Outboard rib 740 of mounting arm 475 and inboard rib 745 of mounting arm 480 extend inward and serve as connection points to frame member 730.

The size of aperture 30 may be selected to provide a desired level of acceptable strains in the corners but also remain small enough that composite skin 710 is still able to function. The shape, length, or other parameters of clevis 725 may be selected to provide the desired load path or stabilization characteristics of the joint. Other clevises in clevis system 700 may have the same or different shapes, depending on the particular implementation. All of plurality of clevises 715 are installed from the top down through aperture 30, however plurality of clevises 715 may be designed differently to install from the underside.

Figure 26:
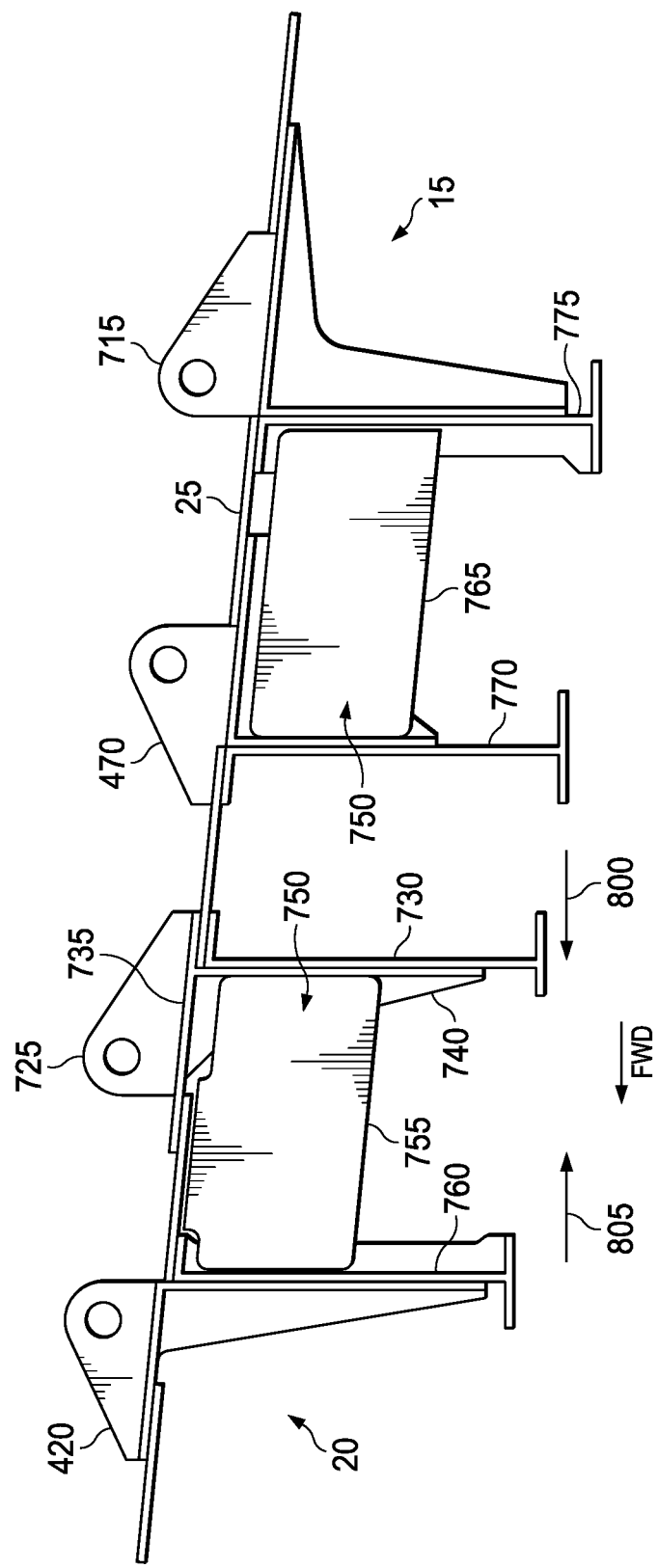
FIG. 26 is an illustration of a side view of an aircraft fuselage having intercostals between frame members in accordance with an illustrative embodiment.

Turning next to FIG. 26, an illustration of a side view of aircraft fuselage 15 having longitudinal intercostals 750 between plurality of frame members 20 is depicted in accordance with an illustrative embodiment. In this illustrative example, intercostals 750 include intercostal 755 between frame member 730 and frame member 760, and intercostal 765 between frame member 770 and frame member 775.

Intercostals 750 are configured to stabilize plurality of frame members 20 against rotation. A similar problem may occur with other clevises. Intercostals 750 are also configured to provide a forward/aft load path for pairs of middle longitudinal lugs 350.

Additional intercostals 750 other than the ones shown here may be added in the illustrative embodiments. For example, an identical intercostal may connect frame member 730 to frame member 760 on the opposite side of aircraft fuselage 15.

Figure 27:
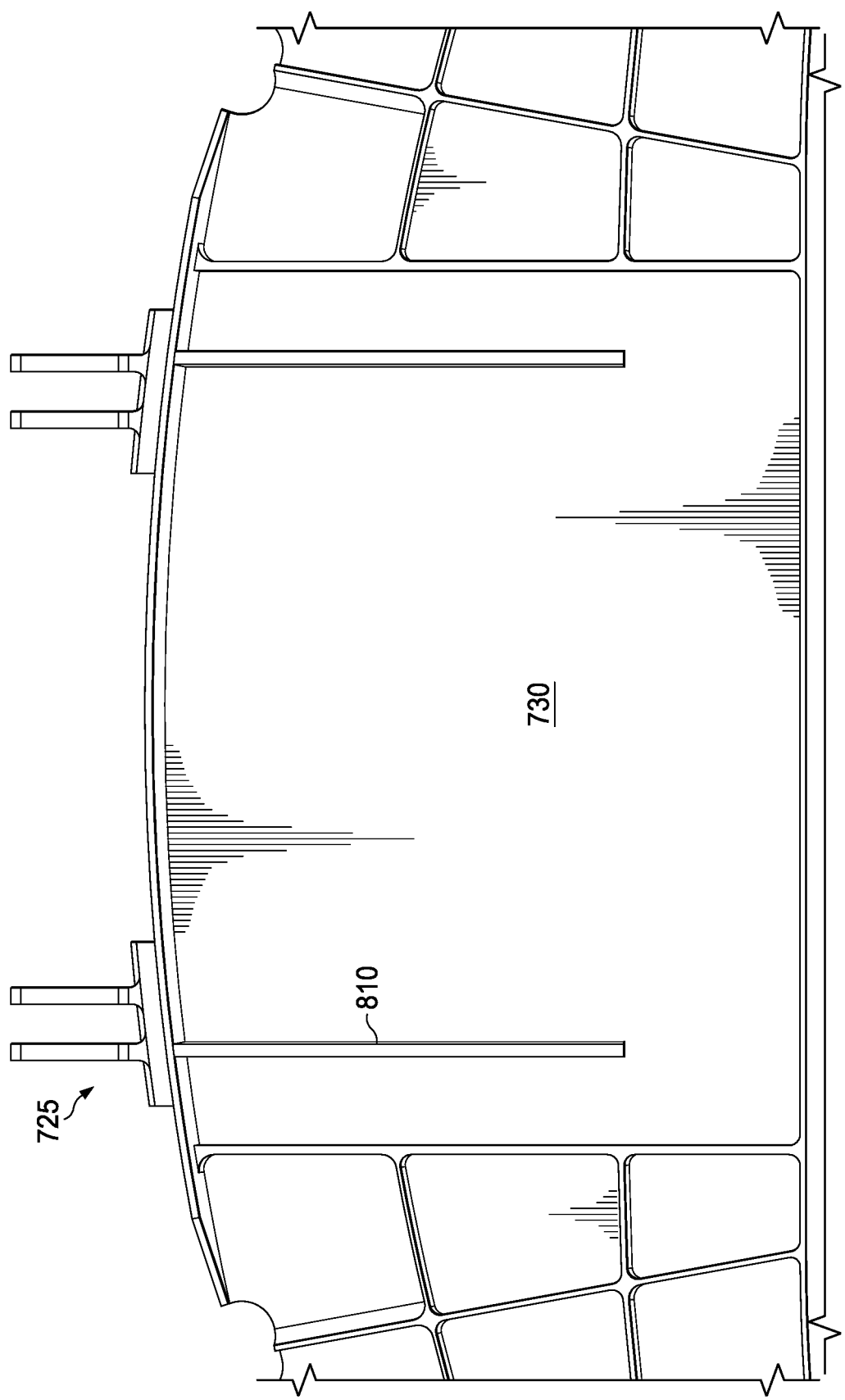
FIG. 27 is an illustration of a frame member in accordance with an illustrative embodiment.
Figure 28:
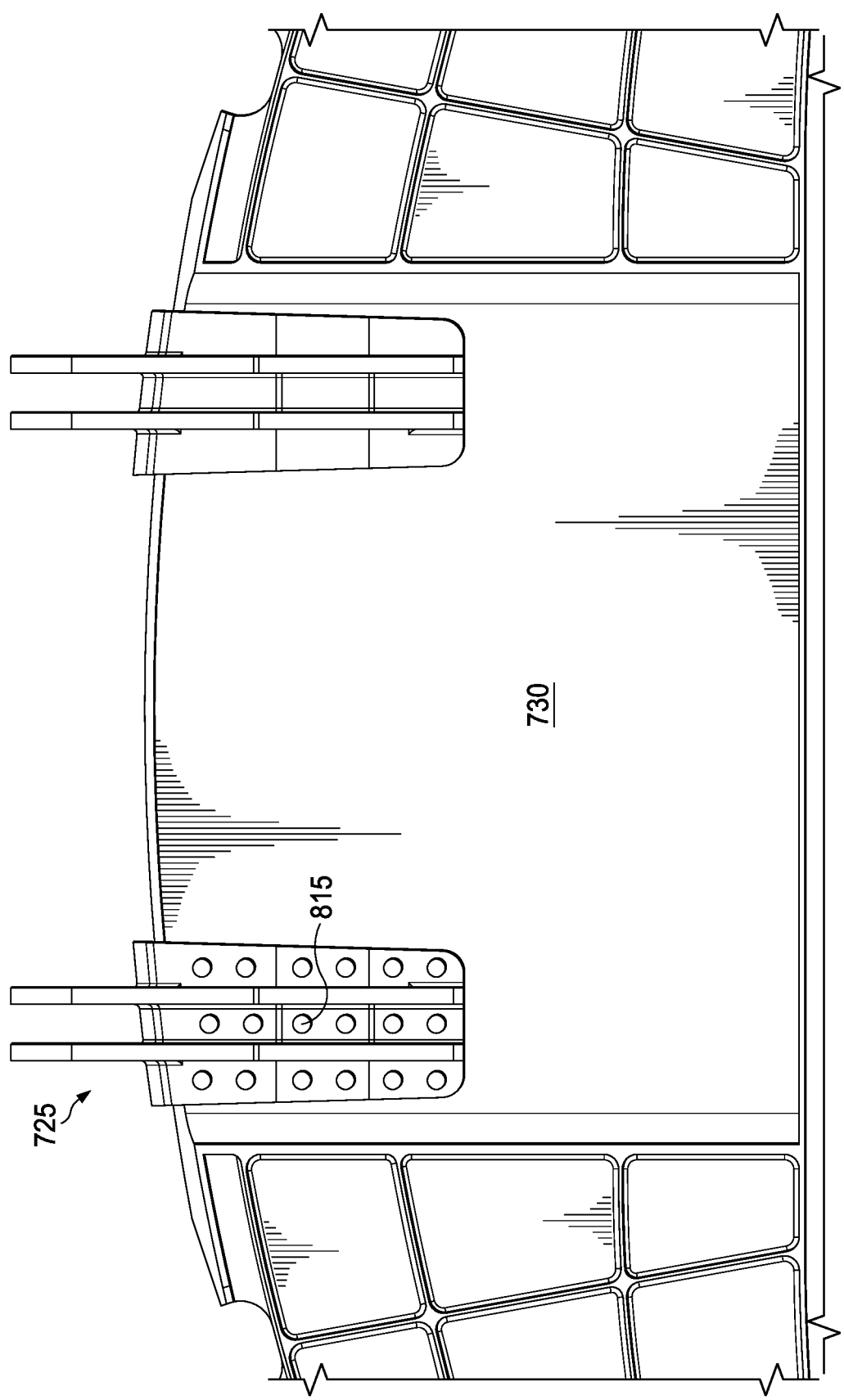
FIG. 28 is another illustration of a frame member in accordance with an illustrative embodiment.

FIG. 27 shows an illustration of frame member 730 from one side, in the direction of arrow 800 in FIG. 26, while FIG. 28 shows frame member 730 from the opposite side, in the direction of arrow 805 in FIG. 26. In FIG. 27, rib 810 of intercostal 755 is oriented in line with outboard rib 740 of mounting arm 475 in clevis 725. The same configuration can be seen opposite clevis 725. The holes in the frame members will be drilled out after plurality of clevises 715 and composite skin 710 are connected. In FIG. 28, additional components in clevis 725 are shown, including fasteners 815 used to attach clevis 725 to frame member 730.

Figure 29:
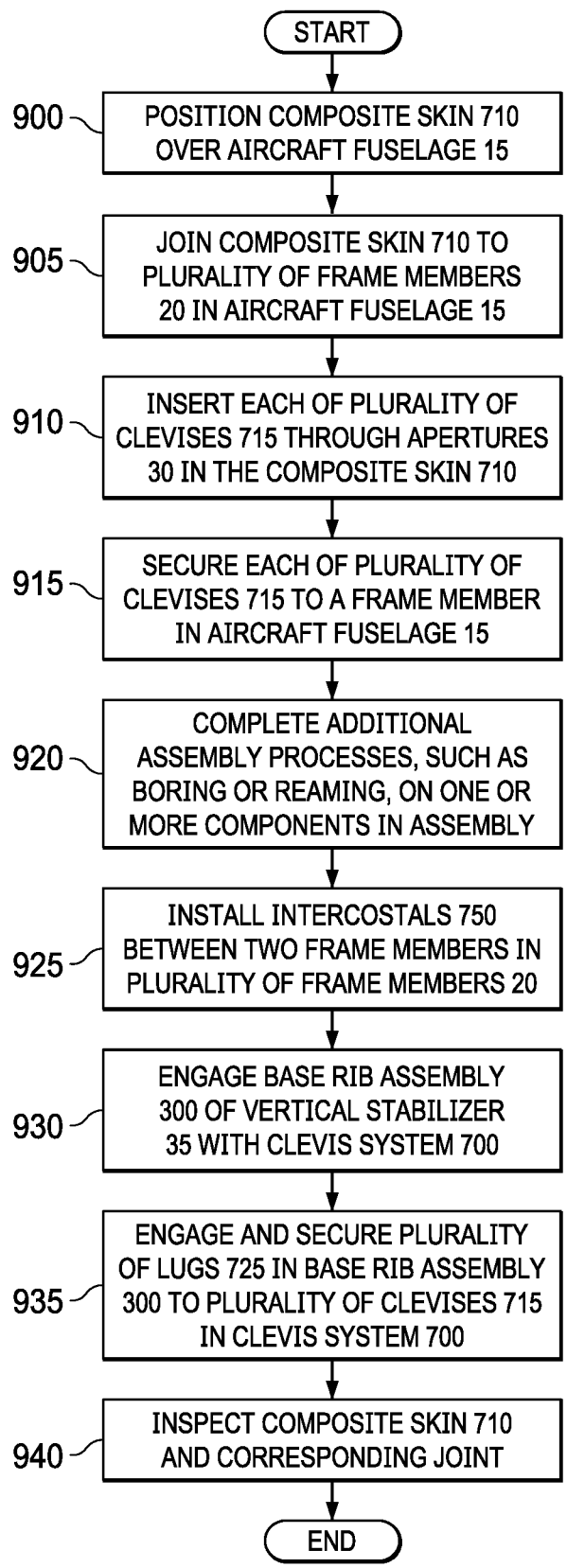
FIG. 29 is an illustration of a flowchart of a process for attaching a vertical stabilizer to an aircraft fuselage using a lug and clevis system in accordance with an illustrative embodiment.

Referring next to FIG. 29, an illustration of a flowchart of a process for attaching vertical stabilizer 35 with multi-spar box 40 to aircraft fuselage 15 using a clevis system 705 is depicted in accordance with an illustrative embodiment. The process begins by positioning composite skin 710 over aircraft fuselage 15 (operation 900). Composite skin 710 is joined to plurality of frame members 20 in aircraft fuselage 15 (operation 905). Next, each of plurality of clevises 715 is inserted through aperture 30 in the composite skin 710 (operation 910).

Next, each of plurality of clevises 715 is secured to a frame member in aircraft fuselage 15 (operation 915). This step occurs after composite skin 710 is joined to aircraft fuselage 15 so that composite skin 710 can be used to locate the parts for station and waterline.

Additional assembly processes, such as boring or reaming, are completed on one or more components in the assembly (operation 920). Plurality of clevises 715 may be partially drilled to undersize prior to installation, but boring and final reaming is to be done after all of plurality of clevises 715 are installed so that the overall hole pattern can be controlled. For example, without limitation, mounting holes in plurality of clevises 715 may be bored or reamed prior to engaging base rib assembly 300 with clevis system 700. A boring/reaming machine may be positioned atop the assembly to perform such processes.

Intercostals 750 may be installed between two frame members in plurality of frame members 20 (operation 925). Base rib assembly 300 of vertical stabilizer 35 may be engaged with clevis system 700 (operation 930). Plurality of lugs 725 in base rib assembly 300 are engaged with plurality of clevises 715 in clevis system 700 and mounting arms are used to secure them (operation 935), all from outside of aircraft fuselage 15.

Optionally, composite skin 710 and corresponding joint are inspected (operation 940), with the process terminating thereafter. The configuration of the vertical stabilizer to composite skin joint as disclosed herein allows manufacturers to eliminate the need for an access panel in the top of aircraft fuselage 15 for inspection of the joint.

Although not discussed specifically with reference to this figure, multi-spar box 40 in vertical stabilizer 35 will be assembled and engaged with base rib assembly 300 at some point before or after the processes are completed in FIG. 29.

Figure 30:
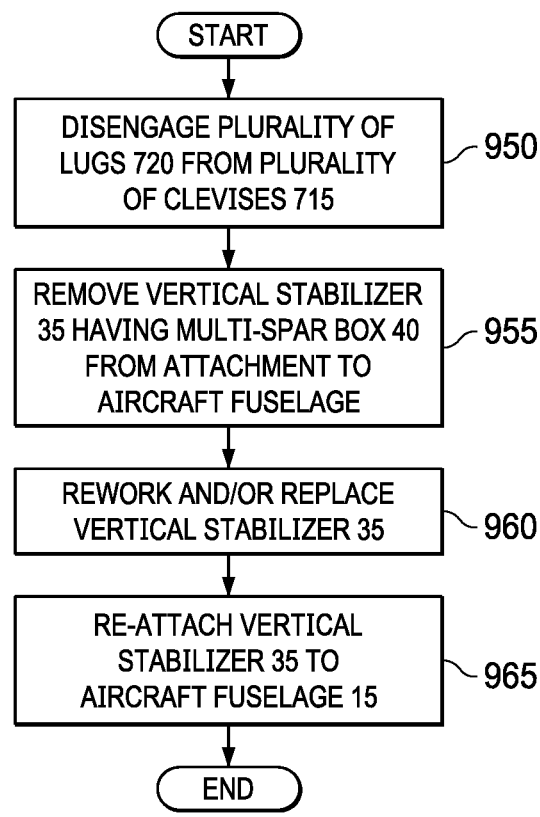
FIG. 30 is an illustration of a flowchart of a process for reworking a vertical stabilizer in accordance with an illustrative embodiment.

FIG. 30 depicts an illustration of a flowchart of a process for reworking vertical stabilizer 35 with multi-spar box 40 in accordance with an illustrative embodiment. The process begins by disengaging plurality of lugs 720 from plurality of clevises 715 (operation 950). Next, vertical stabilizer 35 having multi-spar box 40 is removed from attachment to aircraft fuselage 15 (operation 955).

Vertical stabilizer 35 is then reworked and/or replaced (operation 960). Finally, vertical stabilizer 35 is re-attached to aircraft fuselage 15 as described in FIG. 29 (operation 965), with the process terminating thereafter. In this manner, vertical stabilizer 35 may be removed from the aircraft without damaging, reworking, or dis-assembling components in aircraft fuselage 15, clevis system 700, or other components.

Figure 31:
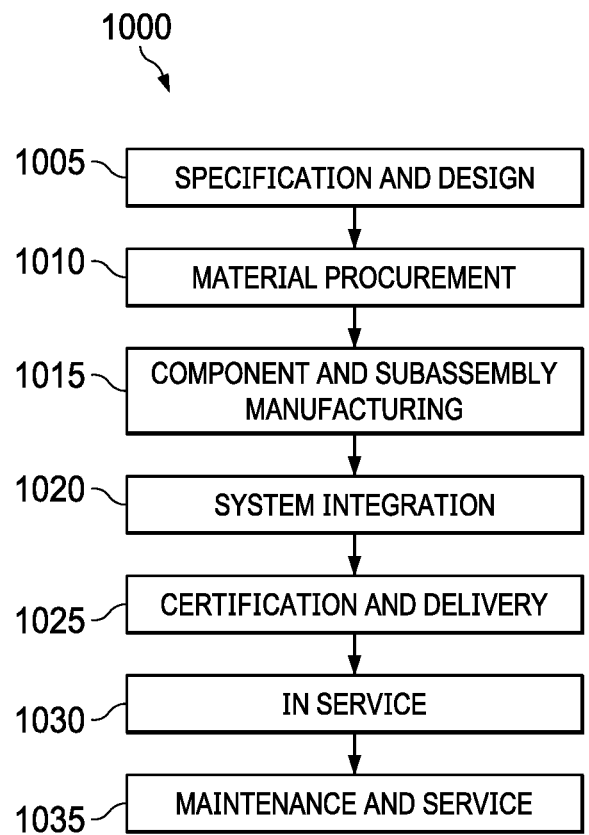
FIG. 31 is an illustration of a block diagram of an aircraft manufacturing and service method in accordance with an illustrative embodiment.
Figure 32:
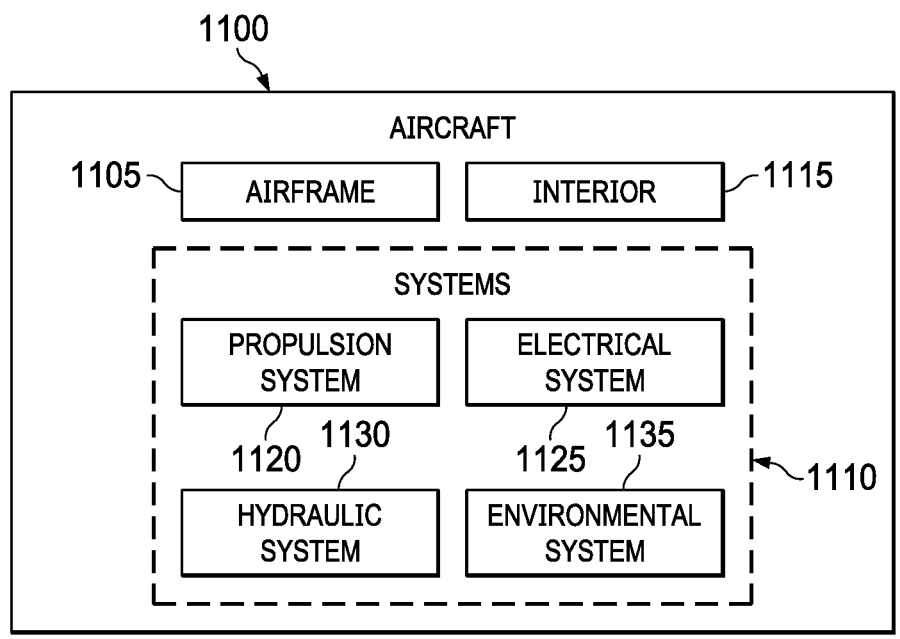
FIG. 32 is an illustration of a block diagram of an aircraft in which an illustrative embodiment may be implemented.

The illustrative embodiments of the disclosure may be further described in the context of aircraft manufacturing and service method 1000 as shown in FIG. 31 and aircraft 1100 as shown in FIG. 32. Turning first to FIG. 31, an illustration of a block diagram of an aircraft manufacturing and service method is depicted in accordance with an illustrative embodiment. During pre-production, aircraft manufacturing and service method 1000 may include specification and design 1005 of aircraft 1100 in FIG. 32 and material procurement 1010.

During production, component and subassembly manufacturing 1015 and system integration 1020 of aircraft 1100 in FIG. 32 takes place. Thereafter, aircraft 1100 in FIG. 32 may go through certification and delivery 1025 in order to be placed in service 1030. While in service 1035 by a customer, aircraft 1100 in FIG. 11 is scheduled for routine maintenance and service 1035, which may include modification, reconfiguration, refurbishment, and other maintenance, service, or inspection.

Base rib assembly 300, vertical stabilizer 35 with multi-spar box 40, and all the components therein such as clevis system 700, may be installed on an aircraft during component and subassembly manufacturing 1015. In addition, all of these components may be retrofitted onto aircraft 1100 or reworked during routine maintenance and service 1035 as part of a modification, reconfiguration, or refurbishment of aircraft 1100 in FIG. 32.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 32, an illustration of a block diagram of an aircraft is depicted in which an illustrative embodiment may be implemented. In this example, aircraft 1100 is produced by aircraft manufacturing and service method 1000 in FIG. 31 and may include airframe 1105 with plurality of systems 1110 and interior 1115. Examples of systems 1110 include one or more of propulsion system 1120, electrical system 1125, hydraulic system 1130, and environmental system 1135. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 31. In one illustrative example, components or subassemblies produced in component and subassembly manufacturing 1015 in FIG. 31 may be fabricated or manufactured in a manner similar to components or subassemblies produced while aircraft 1100 is in service 1030 in FIG. 31. As yet another example, one or more apparatus embodiments, method embodiments, or a combination thereof may be utilized during production stages, such as component and subassembly manufacturing 906 and system integration 1020 in FIG. 31. One or more apparatus embodiments, method embodiments, or a combination thereof may be utilized while aircraft 1100 is in service 1030, during maintenance and service 1035, inclusive of inspection, in FIG. 31, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for attaching a vertical stabilizer having a multi-spar box to an aircraft fuselage using a clevis system, the method comprising:
   installing a composite skin having apertures for receiving a plurality of clevises in a clevis system;
   inserting each of the plurality of clevises through the apertures in the composite skin;
   securing each of the plurality of clevises to a frame member in the aircraft fuselage;
   engaging a base rib assembly of the vertical stabilizer with the clevis system; and
   securing a plurality of lugs in the base rib assembly to the plurality of clevises in the clevis system,
   wherein the multi-spar box comprises:
   a front spar;
   a rear spar;
   at least one mid spar positioned between and spaced apart from the front spar and the rear spar;
   a first side skin extending between the front spar and the rear spar; and
   a second side skin, opposite the first side skin, extending between the front spar and the rear spar, wherein the front spar and rear spar and the first side skin and the second side skin define an interior of the multi-spar box, and
   wherein the base rib assembly comprises:
   a pair of opposing middle longitudinal lugs disposed between a front of the base rib assembly and a rear of the base rib assembly;
   a pair of front lateral lugs positioned along the front of the base rib assembly; and
   a pair of rear lateral lugs positioned along the rear of the base rib assembly.

2. The method of claim 1 further comprising:
   boring mounting holes in the plurality of clevises.

3. The method of claim 2 further comprising:
   reaming the mounting holes in the plurality of clevises.

4. The method of claim 1, wherein securing the plurality of lugs comprises:
   inserting, from outside the aircraft fuselage, a retaining member through each mounting hole in each corresponding lug and clevis.

5. The method of claim 4 further comprising:
   inspecting, from outside the aircraft fuselage, the composite skin.

6. The method of claim 4 further comprising:
   disengaging the plurality of lugs from the plurality of clevises;
   removing the vertical stabilizer from attachment to the aircraft fuselage; and
   reworking the vertical stabilizer.

7. The method of claim 6 further comprising:
   re-attaching the vertical stabilizer to the aircraft fuselage.

8. The method of claim 1, wherein securing each of the plurality of clevises to the frame member comprises:
   fastening the plurality of clevises directly to the composite skin.

9. A method for attaching a vertical stabilizer having a multi-spar box to an aircraft fuselage with a composite skin, the method comprising:
   positioning the composite skin over the aircraft fuselage, the composite skin having apertures for receiving a plurality of clevises in a clevis system;
   joining the composite skin to a plurality of frame members in the aircraft fuselage;
   inserting each of the plurality of clevises through the apertures in the composite skin;
   securing each of the plurality of clevises to a frame member in the aircraft fuselage;
   installing an intercostal between two frame members in the plurality of frame members;
   engaging a base rib assembly of the vertical stabilizer with the clevis system;
   securing a plurality of lugs in the base rib assembly to the plurality of clevises in the clevis system;
   boring mounting holes in the plurality of clevises;
   reaming the mounting holes in the plurality of clevises prior to engaging the base rib assembly with the clevis system; and
   assembling the vertical stabilizer having the multi-spar box,
   wherein assembling the vertical stabilizer comprises:
   positioning a front plate adjacent an exterior surface of a front spar and securing the front plate to the front spar and the base rib assembly, the front plate having a pair of lateral lugs corresponding to the pair of front lateral lugs of the base rib assembly, the lateral lugs of the front plate each having a mounting hole that aligns with the mounting holes in the corresponding lateral lugs of the base rib assembly;
   positioning a rear plate adjacent an exterior surface of a rear spar, opposite the front plate, and securing the rear plate to the rear spar and the base rib assembly, the rear plate having a pair of rear lateral lugs corresponding to the pair of rear lateral lugs of the base rib assembly, the lateral lugs of the rear plate each having a mounting hole that aligns with the mounting holes in the corresponding lateral lugs of the base rib assembly;
   positioning a first side plate adjacent an exterior surface of a first side skin of the multi-spar box and securing the first side plate to the first side skin and the base rib assembly, the first side plate having at least one longitudinal lug corresponding to one of a pair of opposing middle longitudinal lugs of the base rib assembly, each of the at least one longitudinal lug of the first side plate having a mounting hole that aligns with the mounting hole in the corresponding middle longitudinal lug of the base rib assembly; and
   positioning a second side plate adjacent an exterior surface of a second side skin of the multi-spar box and securing the second side plate to the second side skin and the base rib assembly, the second side plate having at least one longitudinal lug corresponding to the other of the pair of opposing middle longitudinal lugs of the base rib assembly, each of the at least one longitudinal lug of the second side plate having a mounting hole that aligns with the mounting hole in the corresponding middle longitudinal lug of the base rib assembly.

10. The method of claim 9, wherein securing the plurality of lugs in the base rib assembly to the plurality of clevises in the clevis system occurs from outside, not inside, of the aircraft fuselage.

11. An aircraft comprising:
an aircraft fuselage having a plurality of frame members and a composite skin;
a vertical stabilizer having a multi-spar box;
a base rib assembly secured to the multi-spar box, wherein the base rib assembly has a plurality of lugs;
a clevis system inserted through apertures in the composite skin and attached to the plurality of frame members, wherein the clevis system is configured to receive the plurality of lugs; and
retaining members inserted through corresponding mounting holes in the plurality of lugs and a plurality of clevises, wherein the retaining members attach the vertical stabilizer to the aircraft fuselage,
wherein the multi-spar box comprises:
a front spar;
a rear spar;
at least one mid spar positioned between and spaced apart from the front spar and the rear spar;
a first side skin extending between the front spar and the rear spar; and
a second side skin, opposite the first side skin, extending between the front spar and the rear spar, wherein the front spar and rear spar and the first side skin and the second side skin define an interior of the multi-spar box, and
wherein the base rib assembly comprises:
a pair of opposing middle longitudinal lugs disposed between a front of the base rib assembly and a rear of the base rib assembly;
a pair of front lateral lugs positioned along the front of the base rib assembly; and
a pair of rear lateral lugs positioned along the rear of the base rib assembly.

12. The aircraft of claim 11, wherein the plurality of clevises is fastened directly to the composite skin.

13. The aircraft of claim 11, wherein the clevis system comprises:
a pair of middle clevises corresponding to the pair of middle longitudinal lugs, the middle clevises extending through corresponding apertures in the composite skin and secured to one of the plurality of frame members;
a pair of front clevises positioned between the pair of front lateral lugs, the pair of front lateral clevises extending through corresponding apertures in the composite skin and secured to one of the plurality of frame members; and
a pair of rear lateral clevises positioned between the pair of rear lateral lugs, the pair of rear lateral clevises extending through corresponding apertures in the composite skin and secured to one of the plurality of frame members.

14. The aircraft of claim 13, further comprising:
a longitudinal intercostal positioned between two of the plurality of frame members attached to the middle clevises, wherein the longitudinal intercostal is configured to stabilize the plurality of frame members against rotation.

15. The aircraft of claim 11, wherein each of the plurality of clevises has a first mounting arm and a second mounting arm.

16. The method of claim 2, wherein securing each of the plurality of clevises to the frame member comprises:
fastening the plurality of clevises directly to the composite skin.

17. The method of claim 4, wherein securing each of the plurality of clevises to the frame member comprises:
fastening the plurality of clevises directly to the composite skin.

18. The aircraft of claim 13, wherein the plurality of clevises is fastened directly to the composite skin.

19. The aircraft of claim 13, wherein each of the plurality of clevises has a first mounting arm and a second mounting arm.

20. The aircraft of claim 14, wherein the plurality of clevises is fastened directly to the composite skin.

21. The aircraft of claim 14, wherein each of the plurality of clevises has a first mounting arm and a second mounting arm.

* * * * *